(12) United States Patent
Yoshioka et al.

(10) Patent No.: US 7,356,403 B2
(45) Date of Patent: Apr. 8, 2008

(54) CONTROL APPARATUS AND PROCESS FOR INTERNAL COMBUSTION ENGINE

(75) Inventors: Youko Yoshioka, Yokohama (JP); Takeshi Sato, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 592 days.

(21) Appl. No.: 11/045,350

(22) Filed: Jan. 31, 2005

(65) Prior Publication Data
US 2005/0171670 A1  Aug. 4, 2005

(30) Foreign Application Priority Data

| Jan. 30, 2004 | (JP) | ............................. 2004-022350 |
| Jan. 30, 2004 | (JP) | ............................. 2004-022351 |

(51) Int. Cl.
*F02D 41/10* (2006.01)
*B60K 41/12* (2006.01)

(52) U.S. Cl. ........................ 701/108; 701/54; 477/48

(58) Field of Classification Search .................... None
See application file for complete search history.

(56) References Cited

U.S. PATENT DOCUMENTS

| 4,245,606 A | * | 1/1981 | Okamura ............... 123/568.29 |
| 4,454,854 A | * | 6/1984 | Gotoh et al. ........... 123/568.27 |
| 6,029,451 A | * | 2/2000 | Gartner ..................... 60/605.2 |
| 6,058,906 A | * | 5/2000 | Yoshino ..................... 123/295 |
| 6,157,885 A | * | 12/2000 | Sakaguchi et al. ............ 701/54 |
| RE37,269 E | * | 7/2001 | Yamaguchi et al. ........ 123/308 |
| 6,704,641 B2 | * | 3/2004 | Tashiro et al. .............. 701/110 |

FOREIGN PATENT DOCUMENTS

| EP | 0 641 925 A2 | 3/1995 |
| EP | 0 967 377 A2 | 12/1999 |
| JP | 60-192870 A | 10/1985 |
| JP | 3-172666 A | 7/1991 |
| JP | 2000-205004 A | 7/2000 |

* cited by examiner

*Primary Examiner*—Michael J. Zanelli
(74) *Attorney, Agent, or Firm*—Foley & Lardner LLP

(57) ABSTRACT

A control apparatus for an internal combustion engine with an exhaust recirculation system includes an acceleration request sensing section to sense a driver's acceleration request; and an engine operating condition sensing section to sense a current engine operation condition at the time of detection of the driver's acceleration request, to determine a margin from the engine operating condition at the time of detection of the driver's acceleration request, to a fuel economy deterioration region on a higher load side. A controlling section controls the EGR quantity, such as EGR rate, of the exhaust recirculation system in accordance with the margin.

24 Claims, 16 Drawing Sheets

CONTROL APPARATUS AND PROCESS FOR INTERNAL COMBUSTION ENGINE

BACKGROUND OF THE INVENTION

The present invention relates to control technique for an internal combustion engine with an exhaust gas recirculation system or for an internal combustion engine combined with a continuously variable transmission.

An exhaust gas recirculation (EGR) system is apparatus for recirculating part of exhaust gases discharged from an engine, to the intake side of the engine, to reduce the emission of NOx. Recently, the exhaust gas recirculation is used not only for the emission control, but also as one of techniques for improving the fuel consumption by reduction of pumping loss with a greater amount of EGR in a wider engine operation range.

Patent document D1 (JP 2000-205004A) shows an engine control system arranged to decrease an exhaust gas recirculation quantity during vehicle acceleration with depression of an accelerator pedal, to improve the vehicle acceleration response. Patent document D2 (JP H03(1991)-172666) shows a control system which delays a shift operation of a continuously variable transmission in the case of vehicle acceleration.

SUMMARY OF THE INVENTION

However, the limitation of the exhaust gas recirculation during acceleration reduces the effect of exhaust gas recirculation significantly if the exhaust gas recirculation is limited without regard to the engine operating point at that time. In order to improve the fuel consumption, it is desirable to perform the exhaust gas recirculation as much as possible even during acceleration.

If, on the other hand, the exhaust gas recirculation is performed during acceleration in the same manner as in the steady state, the exhaust gas recirculation tends to deteriorate the acceleration response of the vehicle, and even deteriorates the fuel consumption. If the exhaust gas recirculation is continued in a normal mode at the time of driver's depression of the accelerator pedal, the rise of engine torque is slow, and the driver is liable to further depress the accelerator pedal unconsciously, so that the engine operating point enters a high load region detrimental to the fuel economy.

It is an object of the present invention to provide control apparatus or process to decrease the exhaust gas recirculation more effectively in accordance with an engine operating condition.

According to one aspect of the present invention, a control apparatus, comprises: an internal combustion engine; an exhaust recirculation system arranged to recirculate part of exhaust from the engine, into intake stream to the engine; an acceleration request sensing section arranged to sense a driver's acceleration request; an engine operating condition sensing section arranged to sense a current engine operation condition at the time of detection of the driver's acceleration request; and a controlling section configured to estimate a margin from the engine operating condition at the time of detection of the driver's acceleration request, to a fuel economy deterioration region in a high engine load region, and to control an EGR quantity of the exhaust recirculation system in accordance with the margin.

According to another aspect of the invention, a control process for an internal combustion engine equipped with an exhaust recirculation system, comprises: monitoring a driver's accelerator input to detect a driver's acceleration request; sensing an engine operating condition to determine a margin from an engine operating point at the time of detection of the driver's acceleration request, to a fuel economy deterioration region; and controlling an EGR quantity of the exhaust recirculation system in an decreased mode in accordance with the margin.

According to still another aspect of the present invention, a control apparatus for an internal combustion engine equipped with an exhaust recirculation system, the control apparatus comprises: means for detecting a driver's accelerator input by monitoring a driver's accelerator request; means for checking a margin from an engine operating point at the time of detection of the driver's acceleration request, to a fuel economy deterioration region; and means for controlling an EGR quantity of the exhaust recirculation system in an decreased mode in accordance with a result of check of the margin.

DETAILED DESCRIPTION OF THE INVENTION

Figure 1:
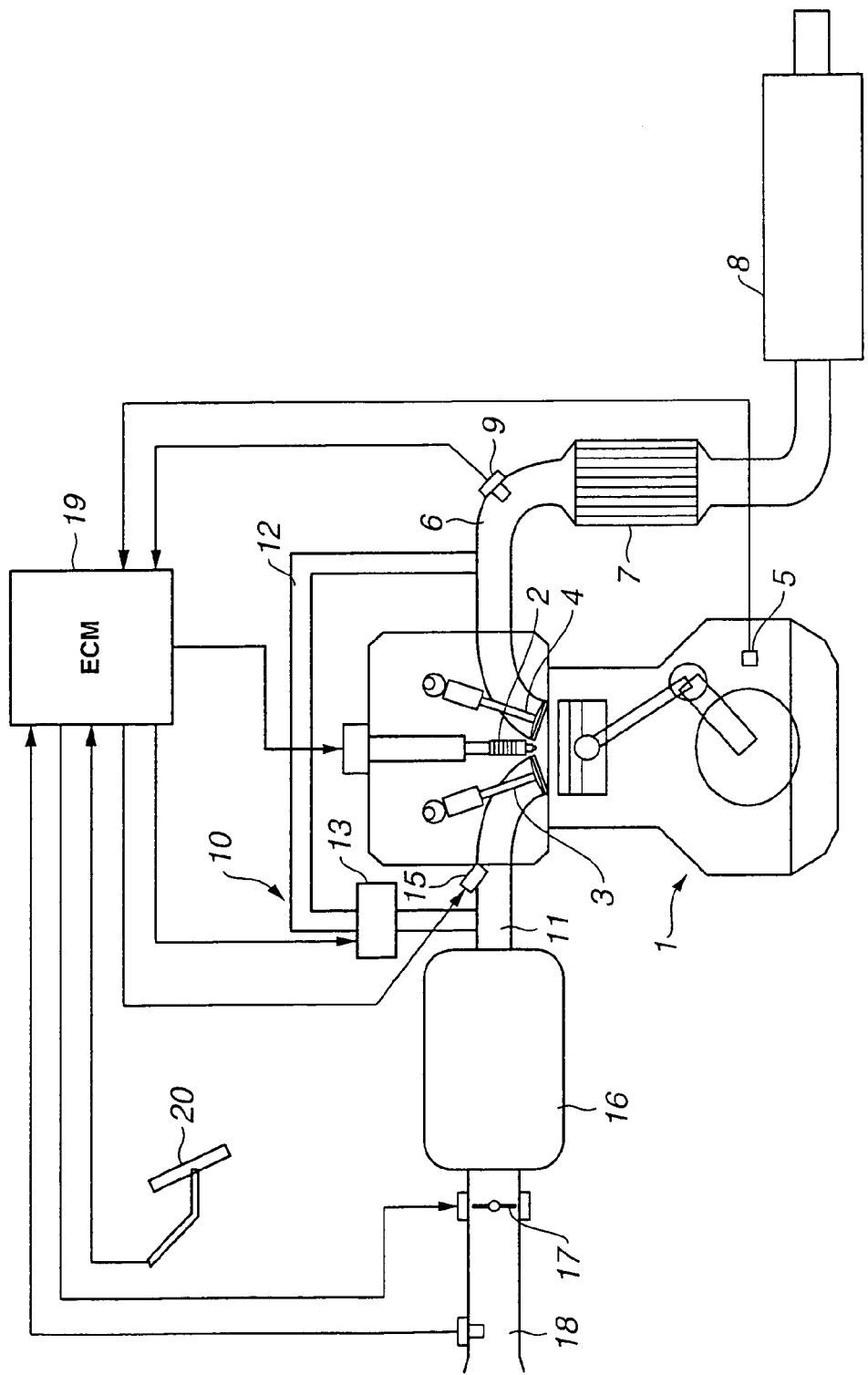
FIG. 1 is a schematic view showing a control system or apparatus according to a first embodiment of the present invention.

FIG. 1 shows a control apparatus or system according to a first embodiment of the present invention. An internal combustion engine 1 of this example is a spark ignition engine having a spark plug 2 located at the center of a combustion chamber, and intake and exhaust valves 3 and 4 for each cylinder. A crank angle sensor 5 is arranged to sense the rotation of a crankshaft of the engine.

In an exhaust passage 6, there are provided a catalytic converter 7 and a muffler 8. At a position upstream of catalytic converter 7, there is provided an air fuel ratio sensor 9 for sensing an exhaust air fuel ratio.

An exhaust gas recirculation system or apparatus 10 of this example includes an exhaust gas recirculation passage (EGR passage) 12 extending from exhaust passage 6 to an intake passage 11, and an exhaust gas recirculation control valve (EGR control valve) 13 disposed in exhaust recirculation passage 12, and arranged to regulate an exhaust gas recirculation (EGR) quantity. In this example, exhaust recirculation control valve is a step motor type valve including a step motor.

A fuel injector 15 is provided in an intake port for each cylinder, and arranged to inject fuel into the intake port of each cylinder of engine 1. Intake passage 11 includes an intake collector section 16 and branch passages extending from collector section 16, respectively, to the cylinders of engine 1. A throttle valve 17 is provided in intake passage 11 on the upstream side of collector section 16. In this example, the throttle valve 17 is an electronically controlled throttle valve including an electric actuator having an electric motor. An engine control module (ECM)(or engine control unit) 19 controls the opening degree of throttle valve 17 by sending a control signal. The electronically controlled throttle valve 17 includes a throttle position sensor for sensing the actual opening degree of throttle valve 17. Engine control module 19 controls the actual throttle opening to a desired target throttle opening by a closed loop control based on the signal from the throttle position sensor. On the upstream side of throttle valve 17, there is provided an airflow meter or sensor 18 for sensing an intake air flow quantity.

An accelerator position (or opening) sensor 20 is arranged to sense a driver's accelerator input. In this example, accelerator position sensor 20 senses the depression degree of an accelerator pedal (that is, an accelerator opening degree APO). The sensor signal of this accelerator position sensor 20 is inputted, together with the sensor signals of the above-mentioned crank angle sensor 5, air fuel ratio sensor 9 and airflow meter 18, into the engine control module 19. In accordance with input information on engine operating conditions sensed by these sensors, the engine control module 19 controls the fuel injection quantity, the fuel injection timing of each fuel injector 15, the ignition timing of each spark plug 2, and the throttle valve opening degree of throttle valve 17.

In this example, engine 1 is combined with a continuously variable transmission (CVT). Drive wheels of a vehicle are driven by engine 1 through the continuously variable transmission. The transmission ratio (or speed ratio) of the continuously variable transmission is controlled continuously in accordance with vehicle operating conditions, mainly in accordance with the accelerator opening degree APO and a vehicle speed.

FIGS. 2-15 show an exhaust gas recirculation control performed by the control system according to the first embodiment.

Figure 2:
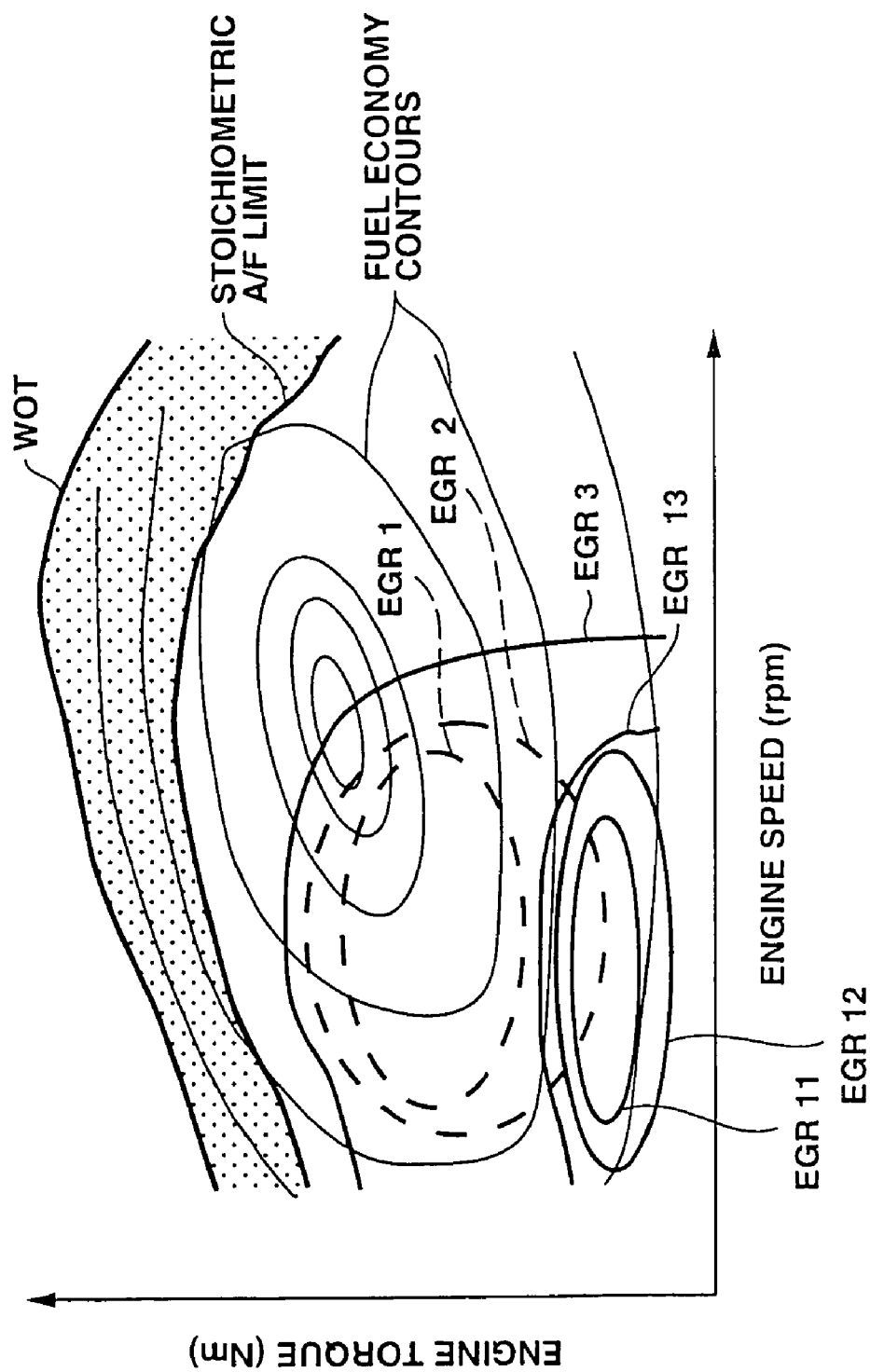
FIG. 2 is a characteristic view showing a fuel enrichment region, and a target exhaust gas recirculation map used in the control system according to the first embodiment.

First, explanation is directed to basic exhaust recirculation control, air fuel ratio control and fuel economy. FIG. 2 shows engine operating characteristics using engine torque and engine speed (rpm) as parameters. An upper most line WOT is a characteristic line for a wide open throttle state in which throttle valve 17 is fully open. The air fuel ratio of engine 1 is controlled in the following manner. The engine 1 is operated at a rich air fuel ratio richer than the stoichiometric ratio in a higher engine load region (or a fuel enrichment region) shown by shading in FIG. 2. This region is bounded between the WOT line and a stoichiometric air fuel ratio limit line (or a lower boundary). In a low and medium load region or stoichiometric air fuel ratio region under the stoichiometric air fuel ratio limit line, the engine 1 is operated so that the target air fuel ratio is set equal to the stoichiometric ratio. In this low and medium load region, the control system controls the fuel injection quantity of each injector 15 in the feedback control mode based on the air fuel ratio sensed by air fuel ratio sensor 9 so as to control the actual air fuel ratio to the theoretical air fuel ratio. In the higher load region above the stoichiometric air fuel ratio limit line, by contrast, the control system quits the feedback air fuel ratio control and instead increases the fuel injection quantity so as to achieve a desired target air fuel ratio on the rich side of the stoichiometry.

In FIG. 2, fuel economy contours are depicted in the form of contour lines. A center region (of medium speed and medium load) surrounded by the fuel economy contours is an optimum fuel consumption region in which the fuel consumption is optimized. The fuel consumption becomes worse gradually as the engine operating point moves away from the central optimum fuel consumption region to the higher load side and to the lower load side. Similarly, the fuel consumption becomes worse gradually as the engine operating point moves away from the central optimum fuel consumption region to the higher speed side and to the lower speed side. Especially in the fuel enrichment region above the stoichiometric air fuel ratio limit line, the fuel consumption becomes worse significantly because of the fuel enrichment to control the air fuel ratio to the rich side. Accordingly, the fuel enrichment region shown by shading is defined as a fuel economy deterioration region, in this example. The fuel consumption is influenced by the ignition timing and other engine operating conditions. Therefore, the stoichiometric air fuel ratio limit line is slightly deviated from the characteristic of the fuel economy contours.

In FIG. 2, characteristics of a target exhaust gas recirculation rate in the exhaust gas recirculation control are shown by lines EGR1, EGR2 and EGR3 in the form of contours. The exhaust gas recirculation rate is greatest in a central region surrounded by the line EGR1. The exhaust gas recirculation rate is set equal to zero, and the exhaust gas recirculation is stopped outside the outermost line EGR3. As shown in FIG. 2, the control system according to this embodiment performs the exhaust gas recirculation at relatively high EGR rates in a wider engine operating region, as compared to an ordinary exhaust gas recirculation system which performs the exhaust gas recirculation only in a relatively narrow regions shown by lines EGR11~EGR13 at relatively low EGR rates. The control system according to this embodiment performs the exhaust gas recirculation as much as possible at higher rates in most of the low and medium load region below the stoichiometric ratio limit, to reduce the pumping loss and hence to improve the fuel economy. Therefore, in the control system according to the embodiment, the frequency of occurrences of driver's acceleration request during the exhaust gas recirculation is higher.

Figure 3:
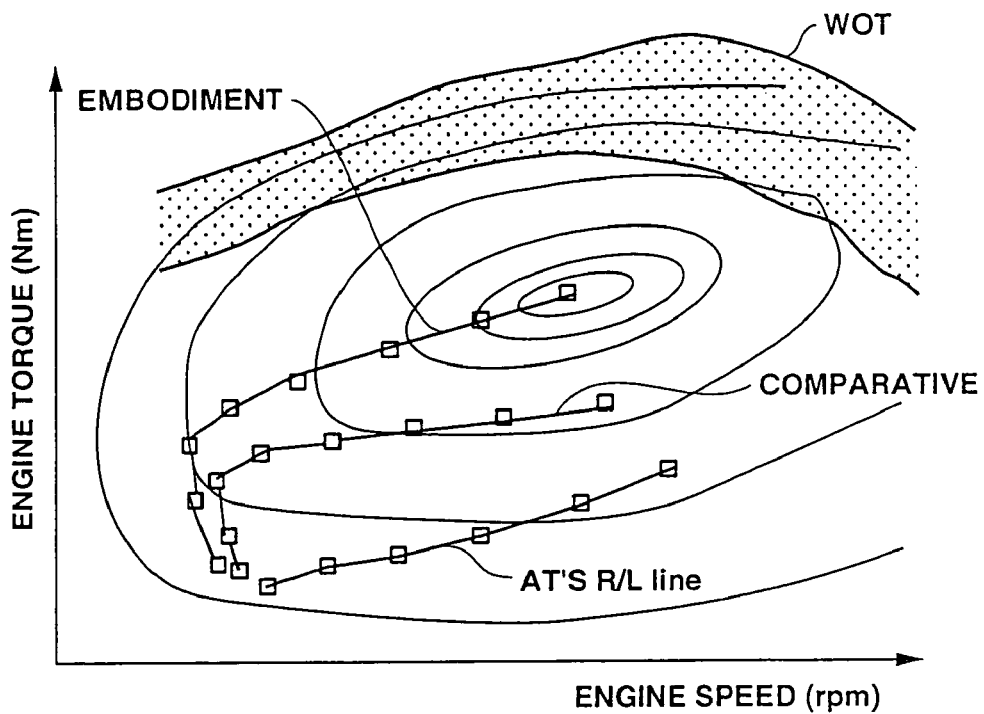
FIG. 3 is a characteristic view showing a transmission control characteristic used in the control system according to the first embodiment.

FIG. 3 shows a CVT speed ratio control performed by the control system according to the embodiment. FIG. 3 shows road load characteristic lines together with the fuel economy contours similar to those of FIG. 2. The road load lines represent characteristics of engine torque and engine speed against a running resistance of a vehicle running on a level road. As shown by a line "EMBODIMENT" in FIG. 3, the control system according to this embodiment is arranged to control the transmission speed ratio of the continuously variable transmission so that the road load characteristic line passes through the optimum fuel consumption point or the central optimum fuel consumption region defined by the fuel economy contours, to improve the fuel consumption. In an ordinary CVT control system as a comparative example shown by "COMPARATIVE" in FIG. 3, the R/L line is located on the lower load side of the optimum fuel consumption region. In the case of a non-continuous multi-speed automatic transmission, as shown by AT's R/L line in FIG. 3, the R/L line extends further below the R/L line of the comparative example. Thus, the control system according to the embodiment is arranged to operate the engine 1 at relative high engine loads to improve the fuel economy. Therefore, in the case of acceleration during travel on a level road, for example, a margin of torque up to the fuel enrichment region is relatively narrow, and hence the frequency of engine operation in the fuel enrichment region tends to become high. In order to improve the actual fuel consumption, it is important to avoid unwanted engine operation in the fuel enrichment region.

Figure 4:
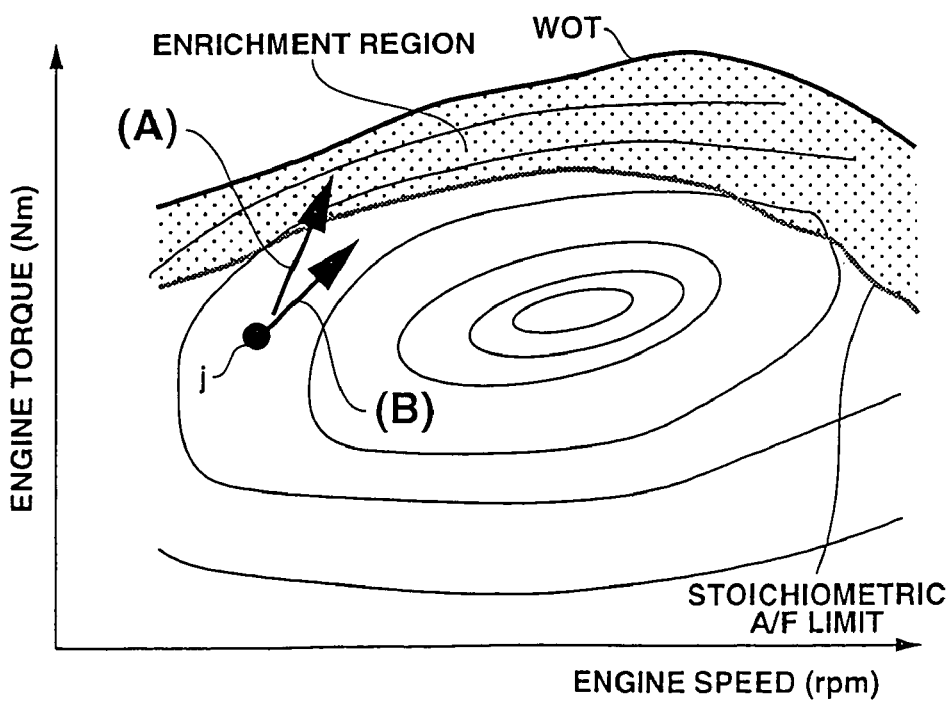
FIG. 4 is a characteristic view illustrating shift of an engine operating point in the control system according to the first embodiment in the case of rapid acceleration.

When the accelerator pedal is depressed at an engine operating point in a region in which the exhaust recirculation is performed, the operation of the engine readily enters the fuel enrichment region if the margin of torque from the engine operating point to the enrichment region is small, as shown in FIG. 4. An engine operating point j shown in FIG. 4 is located within the region in which the exhaust gas recirculation is performed, and near the fuel enrichment region so that the margin (or distance) of torque from the point j to the stoichiometric ratio limit line bounding the fuel enrichment region is narrow. When the driver requests an acceleration by depressing the accelerator pedal in the state in which the engine 1 is operated at the operating point j, the torque does not rise rapidly in response to opening of the throttle valve 17 because the quantity of fresh air entering the combustion chamber is small in the state in which the exhaust gas recirculation quantity is large. As a result, the driver tends to depress the accelerator pedal further unconsciously especially when the driver wants a rapid acceleration. As a result, the engine operating point moves as shown by an arrow (A) shown in FIG. 4, into the fuel enrichment region.

By contrast, the control system according to the first embodiment decreases the exhaust gas recirculation rate as compared to the normal EGR control mode when an acceleration request requesting a rapid acceleration is produced in the state in which the margin of torque is small to the enrichment region. When the EGR rate is decreased in this way, the quantity of the fresh air entering the combustion chamber is increased smoothly, and the engine torque is increased rapidly with increase in the opening degree of throttle valve 17. The driver does not further depress the acceleration pedal uselessly. As a result, the engine operating point moves from the point j, as shown by an arrow (B) in FIG. 4, instead of entering the enrichment region.

When the acceleration request is not for rapid acceleration but for gradual acceleration, or when the margin of torque is large at the time of occurrence of the acceleration request, the control system according to the first embodiment performs the exhaust gas recirculation in the normal mode based on the target EGR control map (including EGR1~EGR3) as shown in FIG. 2, without correcting the EGR rate. Therefore, the control system can reduce the pumping loss and thereby fully improve the fuel consumption.

Figure 5:
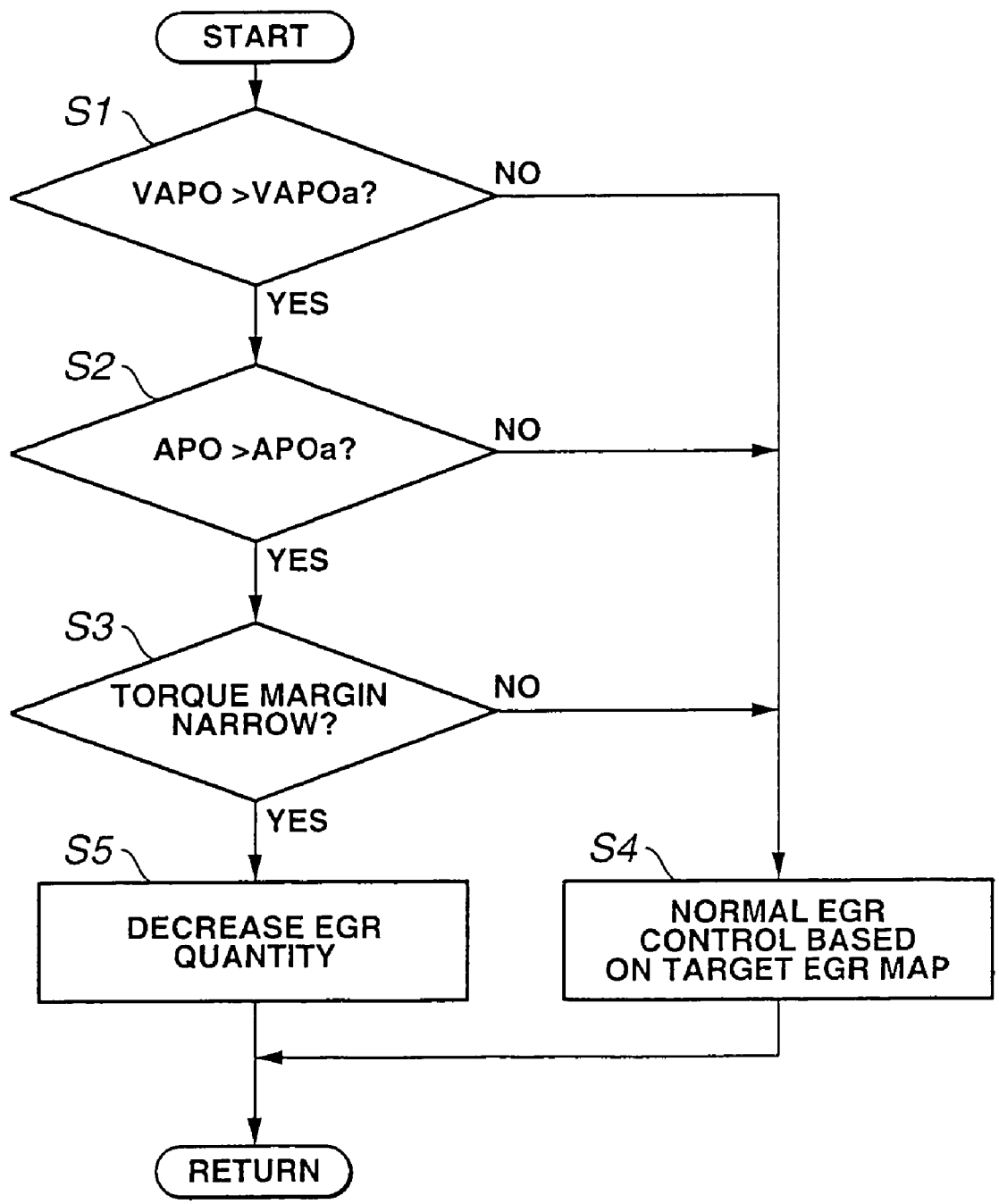
FIG. 5 is a flowchart showing a control process performed by the control system of the first embodiment.

FIG. 5 is a flowchart showing a main portion of an exhaust gas recirculation control performed by the control system according to the first embodiment.

Steps S1 and S2 are for examining whether rapid acceleration is requested by the driver. Step S1 determines whether or not a variation speed (or a time rate of change or accelerator opening speed) VAPO of the accelerator opening degree APO is greater than a predetermined speed value VAPOa. Step S2 determines whether the accelerator opening degree APO is greater than a predetermined degree value APOa. Thus, ECM 19 determines that a driver's rapid acceleration request is produced when the driver depresses the accelerator pedal rapidly and deeply. If the answer of S1 or S2 is NO, then the program proceeds to step S4 for normal EGR control based on the target EGR map of FIG. 2. Therefore, at S4, the exhaust gas recirculation is performed in accordance with the engine operating conditions. In the engine operating region in which the target EGR rate is set equal to zero (outside EGR 3 in FIG. 2, for example), the exhaust gas recirculation is not performed.

When a rapid acceleration request is present and the answers of S1 and S2 are both YES, then the program proceeds to step S3 to determine a margin of torque to the fuel enrichment region in accordance with the engine operating condition at that time, and to determine whether the margin is narrow or not. The way to determine whether the margin is narrow will be explained later. When the margin is wide or sufficient, then the program proceeds from S3 to S4, and the system performs the exhaust gas recirculation in the normal control mode based on the target EGR map. When, on the other hand, the conclusion of S3 is that the margin is narrow or insufficient, then the program proceeds from S3 to step S5 to decrease the EGR rate as compared to the normal EGR control mode of S4. Thus, at S5, ECM 19 determines a corrected target EGR rate by decreasing the normal target EGR rate based on the target EGR map of FIG. 2, and performs the exhaust gas recirculation by using the corrected target EGR rate. The way to decrease the normal target EGR rate will be explained later.

Figure 6:
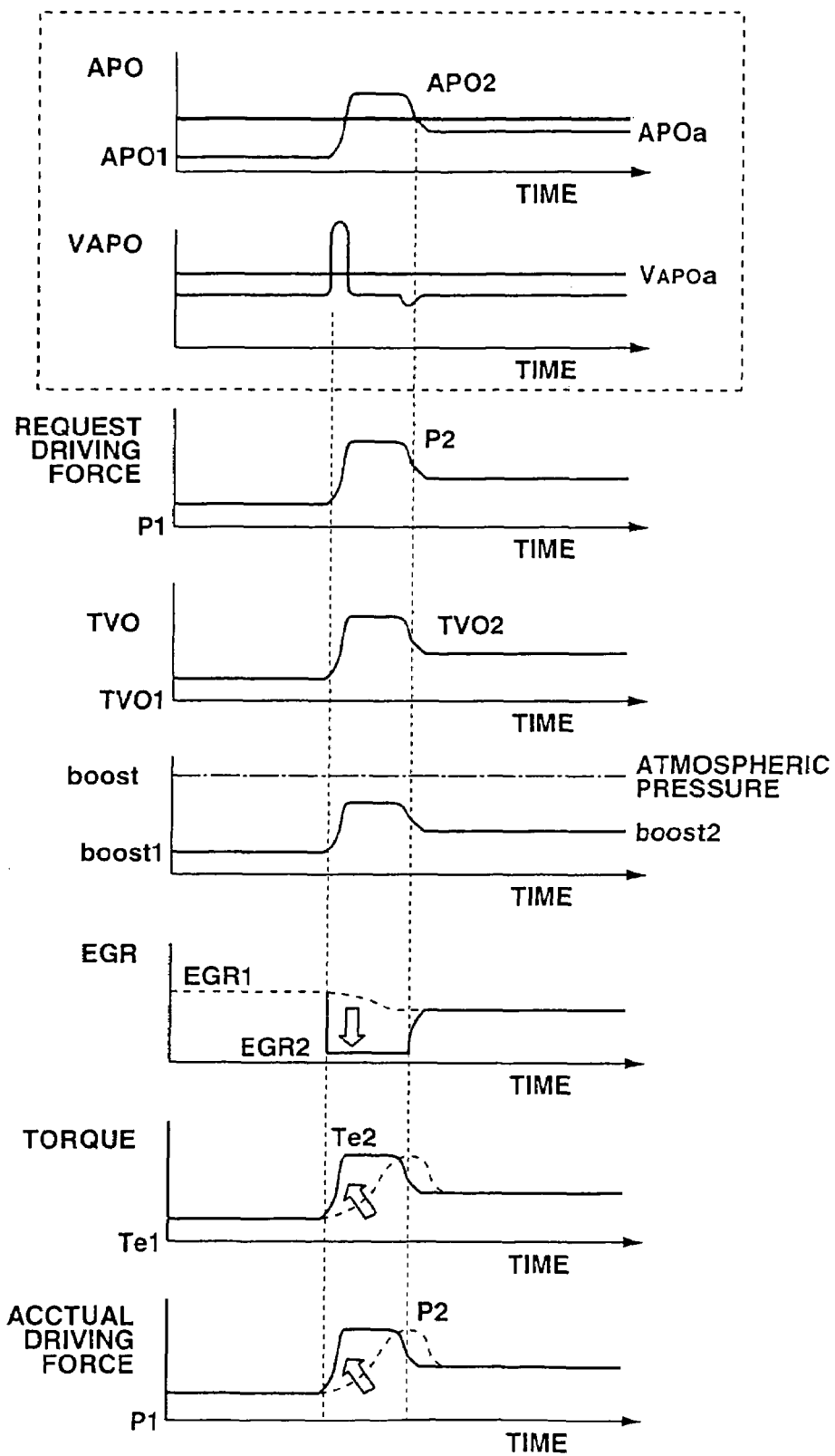
FIG. 6 is a time chart showing variation of various parameters during a rapid acceleration to illustrate operations of the control system according to the first embodiment.

FIG. 6 shows, in the form of time chart, operations of the control system according to the first embodiment in the case of rapid acceleration. FIG. 6 shows variation with time of the accelerator opening degree APO, accelerator opening speed VAPO, a request driving torque P, a throttle valve opening degree TVO, an intake negative pressure (manifold pressure) boost in the collector section 16, exhaust gas recirculation rate EGR, engine torque Te, and actual driving force. In this example, the accelerator opening degree APO exceeds the predetermined value APOa, and at the same time, the accelerator opening speed VAPO exceeds the predetermined value VAPOa. Therefore, the control system concludes that there is a rapid acceleration request. The request driving force P is a driving force (a product of torque and rotational speed) required by the driver's acceleration request. In this example, the request driving torque P is regarded as being substantially equal to the accelerator opening degree APO. The throttle valve opening degree TVO is controlled in accordance with this request driving torque P. Intake negative pressure (boost) varies in accordance with variation of throttle opening degree TVO.

As to each of the exhaust gas recirculation rate EGR, engine torque Te, and actual driving force, a broken line shows a characteristic of the ordinary system and a solid line shows a characteristic according to this embodiment. In the ordinary system, the exhaust gas recirculation rate EGR is held at the level of the target EGR map during the acceleration as shown by the broken line, and the exhaust gas mixture is recirculated in a large amount. Therefore, the engine torque Te rises so slowly that the rise of the actual driving force is delayed with respect to the rise of request driving force P, and the driver is liable to depress the accelerator pedal deeper. In the embodiment, by contrast, the exhaust gas recirculation rate EGR is decreased as shown by the solid line at the time of rapid acceleration request, and the amount of exhaust gas recirculation is limited to a lower level. Therefore, engine torque Te rises rapidly as shown by the solid line, and the actual driving force is produced in conformity with the request driving force. In the example shown in FIG. 6, the exhaust gas recirculation rate EGR is held low from the occurrence of the rapid acceleration request until the accelerator opening degree APO becomes lower than or equal to predetermined value APOa. However, it is important to limit the exhaust gas recirculation at the early stage of acceleration. Therefore, it is optional to hold the exhaust gas recirculation rate at a decreased level for a predetermined time from the occurrence of a rapid acceleration request, and to restore the exhaust gas recirculation rate to a normal level after the expiration of the predetermined time.

Figure 7:
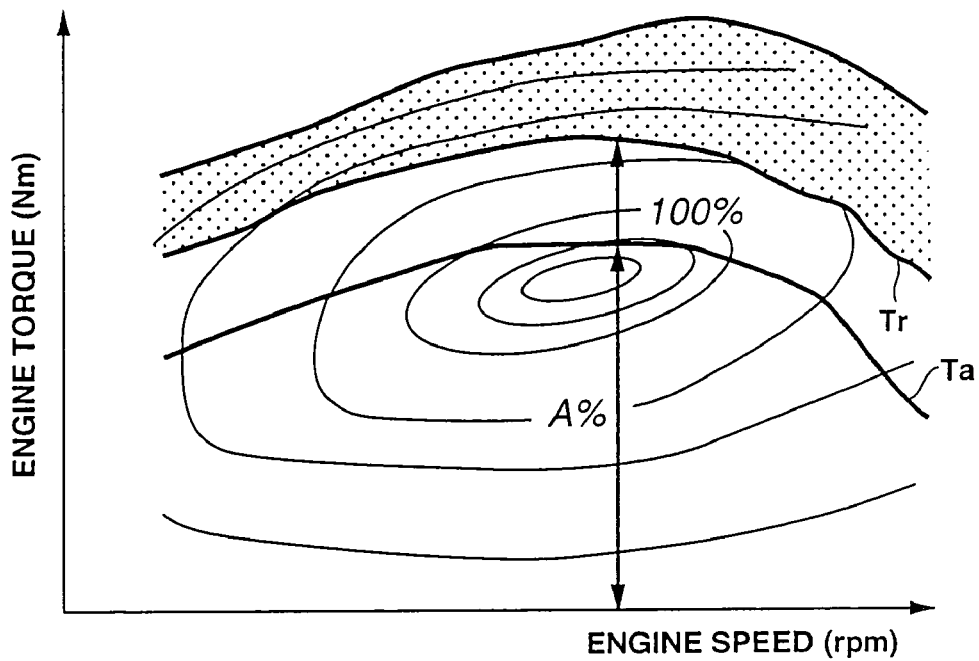
FIG. 7 is a characteristic view for illustrating the examination of torque margin in a first practical example which can be used in the control system of the first embodiment.
Figure 8:
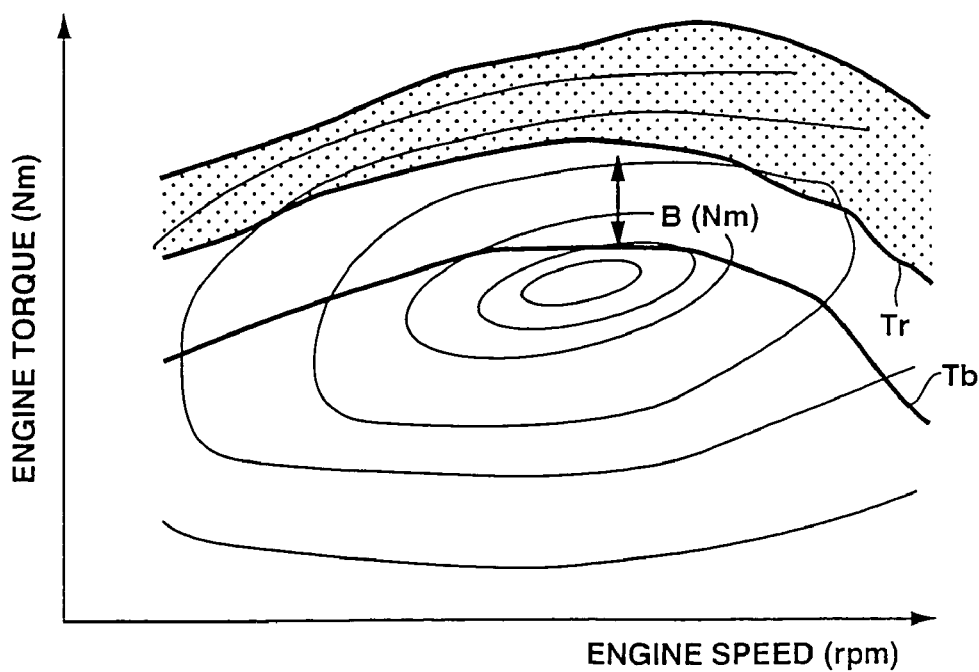
FIG. 8 is a characteristic view for illustrating the examination of torque margin in a second practical example which can be used in the control system of the first embodiment.
Figure 9:
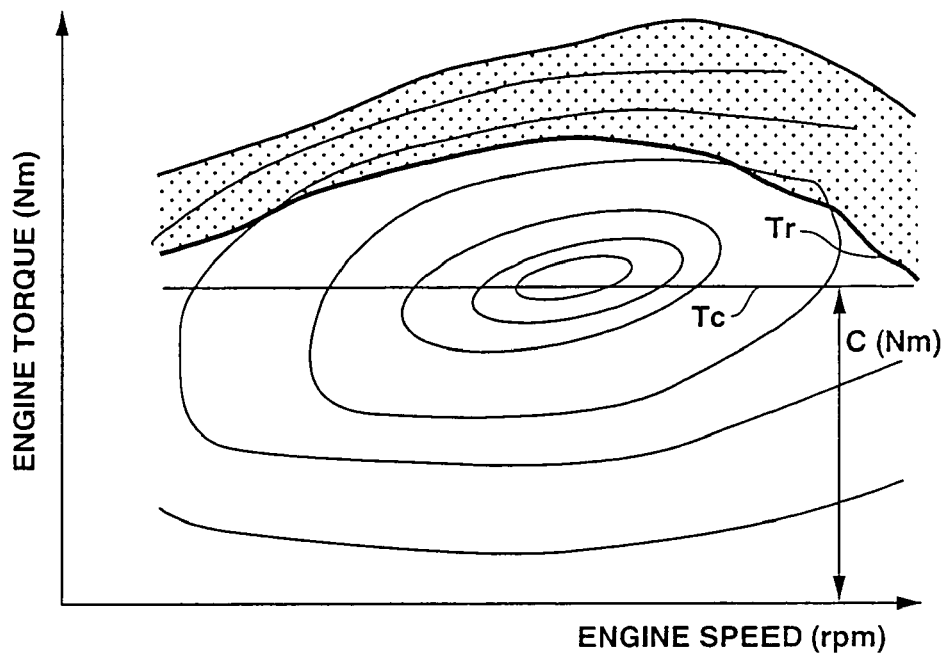
FIG. 9 is a characteristic view for illustrating the examination of torque margin in a third practical example which can be used in the control system of the first embodiment.

The check of the margin of torque at S3 can be performed in one of the following examples shown in FIGS. 7, 8 and 9.

FIG. 7 shows a first practical example. A threshold Ta of this example is a predetermined percentage (A %) of the torque Tr of the stoichiometric air fuel ratio limit line at each value of the engine speed. That is, Ta is set equal to the product resulting from multiplication of A/100 and a value of the torque Tr of the stoichiometric air fuel limit corresponding to a value of the engine speed at the time of a rapid acceleration request (Ta=Tr×A/100). The control system judges that the margin is wide when the torque at the time of occurrence of a rapid acceleration request is smaller than the threshold Ta; and judges that the margin is narrow when the torque at the time of occurrence of the rapid acceleration request is greater than or equal to the threshold Ta. Thus, in this practical example, the answer of S3 is affirmative when the percentage of the engine torque to the torque Tr of the lower boundary of the fuel economy deteriorating region is greater than A (%).

FIG. 8 shows a second practical example. A threshold Tb of this example is determined by subtracting a predetermined torque value B (Nm) from the torque Tr of the stoichiometric air fuel ratio limit line at each value of the engine speed (Tb=Tr−B). The control system judges that the margin is wide when the torque at the time of occurrence of a rapid acceleration request is smaller than the threshold Tb; and judges that the margin is narrow when the torque at the time of occurrence of the rapid acceleration request is greater than or equal to the threshold Tb. Thus, in this practical example, the answer of S3 is affirmative when the torque difference obtained by subtracting the engine torque from the torque Tr of the lower boundary of the fuel economy deteriorating region is smaller than B (Nm).

FIG. 9 shows a third practical example. A threshold Tc (Nm) of this example is a predetermined constant value which is invariable irrespective of the engine speed. The control system judges that the margin is wide when the torque at the time of occurrence of a rapid acceleration request is smaller than the threshold Tc; and judges that the margin is narrow when the torque at the time of occurrence of the rapid acceleration request is greater than or equal to the threshold Tc. In the example of FIG. 9, the threshold Tc is set equal to the smallest value of the torque Tr of the stoichiometric air fuel ratio limit varying with the engine speed.

In checking the margin of torque to the stoichiometric air fuel limit bounding the fuel enrichment region, it is possible to use, in place of the engine torque at the time of detection of a driver's acceleration request, a parameter (torque parameter or load parameter) representing the engine torque, such as the intake air quantity of the engine, the fuel injection pulse width, the throttle valve opening degree TVO and the intake negative pressure boost.

The exhaust gas recirculation rate can be decreased at step S5 in one of the following examples shown in FIGS. 10 and 11, FIGS. 12 and 13 and FIGS. 14 and 15.

Figure 10:
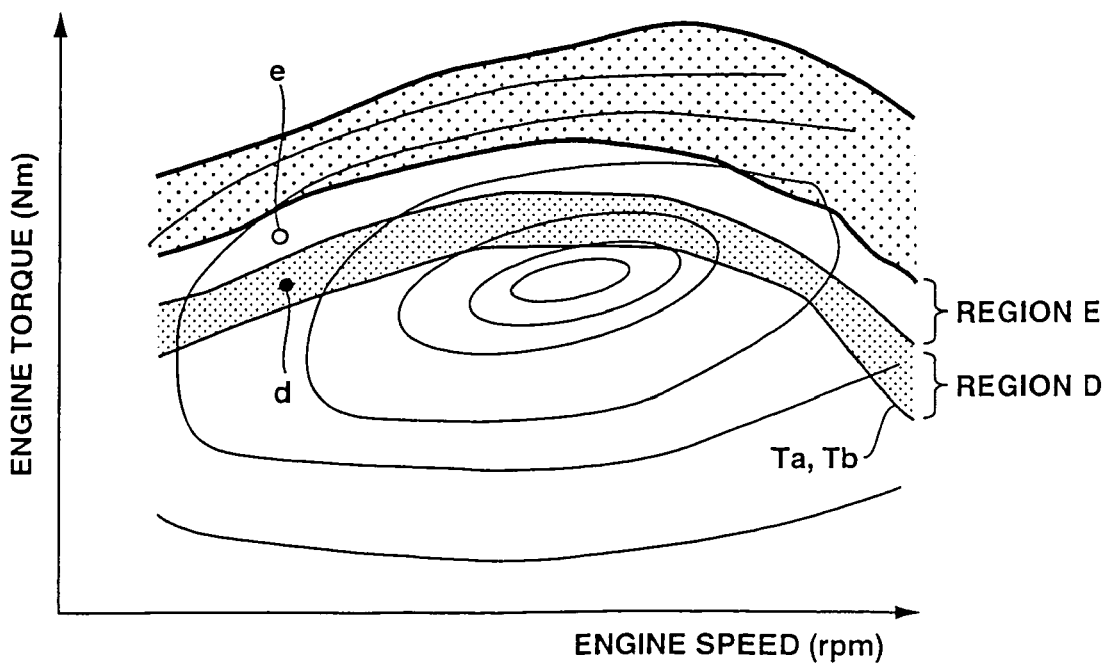
FIG. 10 is a characteristic view for illustrating the decrease correction of exhaust gas recirculation in a first practical example which can be used in the control system of the first embodiment.
Figure 11:
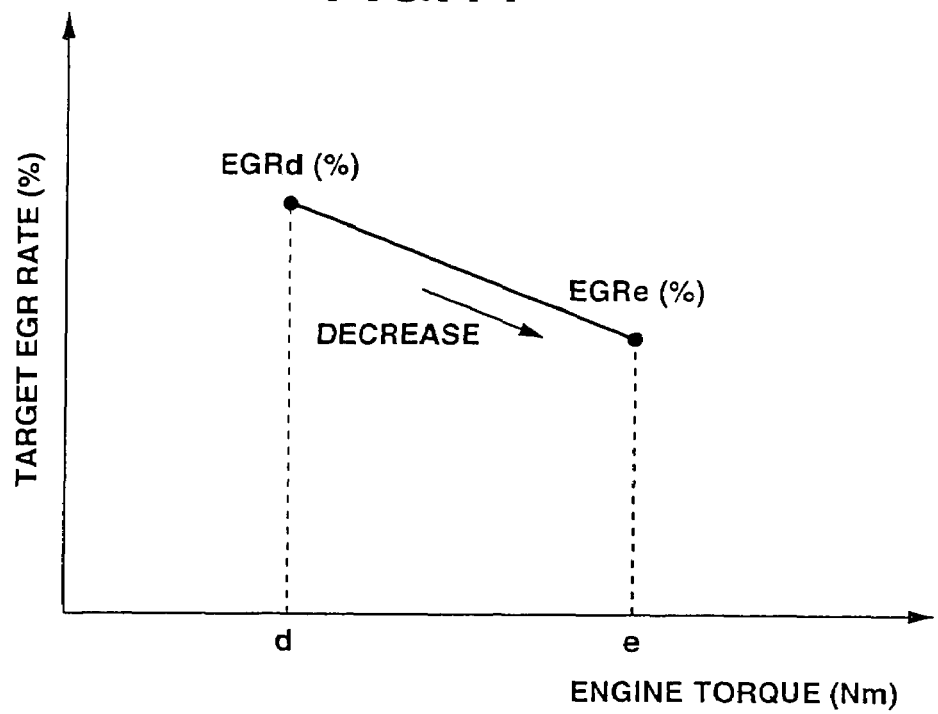
FIG. 11 is a characteristic view between target EGR rate and engine torque to illustrate the first practical example of FIG. 10.

FIGS. 10 and 11 show a first practical example. In this example, the region bounded between the stoichiometric air fuel ratio limit line (Tr) and the threshold line of the threshold (Ta of FIG. 7 or Tb of FIG. 8, for example) is divided into a plurality of regions. In the example of FIG. 10, the region between the limit line and the threshold line is divided into a lower (lower load) region D and an upper (higher load) region E by a line extending between the stoichiometric air fuel ratio limit line and the threshold line, as shown in FIG. 10. A decreased target EGR rate EGRd is set for a torque value of a middle point d in the lower region D, and a decreased target EGR rate EGRe is set for a torque value of a middle point e in the upper region E. Each of the decreased target EGR rates EGRd and EGRe is a target EGR rate decreased as compared to the target EGR rate of the normal target EGR map. Then, the target EGR rate is determined by interpolation by using the decreased target EGR rates EGRd and EGRe, in accordance with the engine torque at the time of rapid acceleration request, as shown in FIG. 11. The target EGR torque EGRe of the upper region E where the margin is narrower is smaller than the target EGR rate EGRd of the lower region D where the margin is wider. Therefore, the target EGR rate is decreased as the margin becomes narrower. By varying the decrease quantity of the exhaust gas recirculation in accordance with the magnitude of the margin of torque in this way, the control system can avoid operation in the fuel enrichment region caused by deeper depression of the accelerator pedal, and further improve the fuel consumption with the maximum exhaust gas recirculation.

Figure 12:
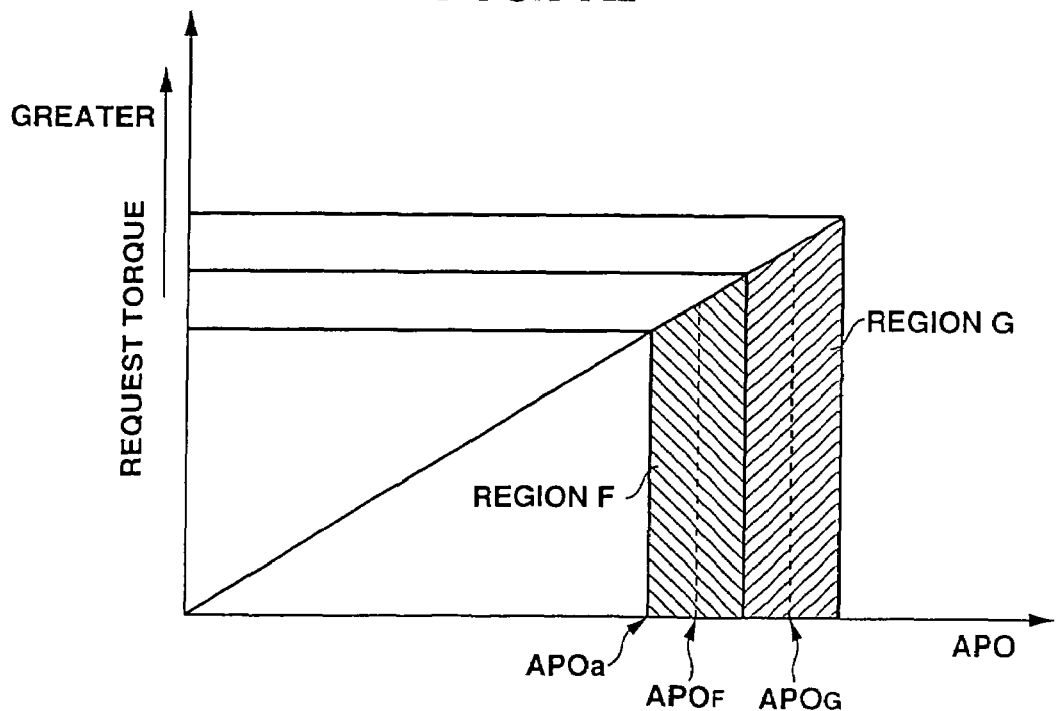
FIG. 12 is a characteristic view between the request torque and accelerator opening degree, for illustrating the decrease correction of exhaust gas recirculation in a second practical example which can be used in the control system of the first embodiment.
Figure 13:
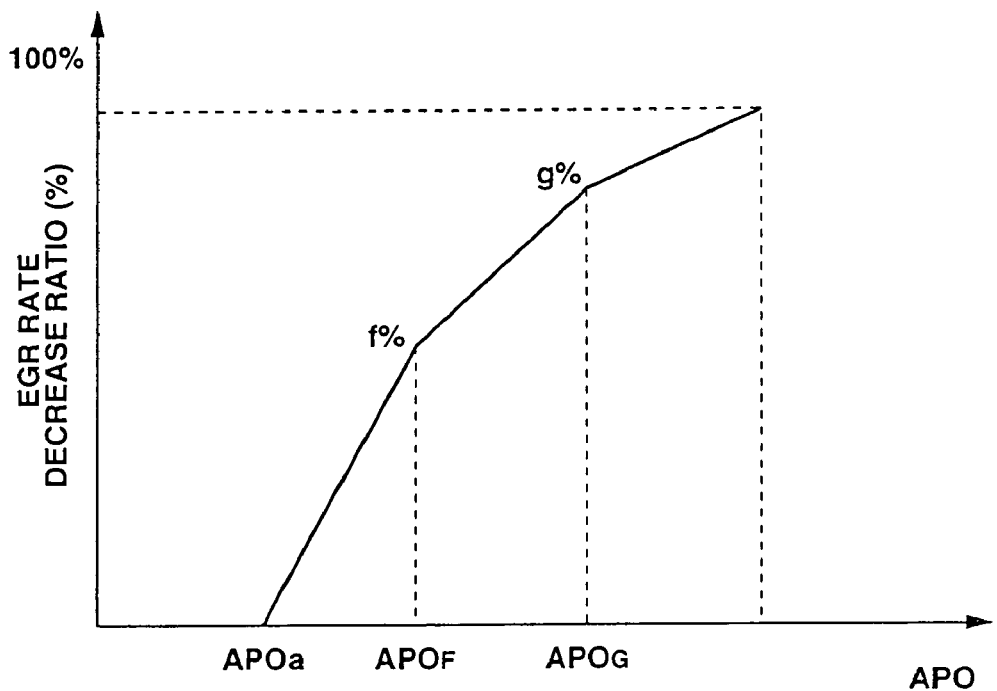
FIG. 13 is a characteristic view between a target EGR rate decrease ratio and accelerator opening degree to illustrate the second practical example of FIG. 12.

FIGS. 12 and 13 show a second practical example in which the decrease ratio or percentage (%) of the target EGR rate is determined in accordance with the accelerator opening degree APO. The decrease ratio is a ratio of a decrease to the value of the normal target EGR map. The normal target EGR rate is used without modification if the decrease ratio is equal to 0 (%). If the decrease ratio is equal to 100%, the final target EGR rate becomes equal to 0. As shown in FIG. 13, in the region in which the accelerator opening degree APO is equal to or smaller than the predetermined value APOa used at S2, the decrease ratio is zero. The decrease ratio is increased as the accelerator opening degree APO increases from APOa. The decrease ratio becomes equal to 100% when the accelerator opening degree APO becomes equal to a value at or near the fully open state of the accelerator. In this example, as shown in FIG. 12, the region of the accelerator opening degree APO greater than APOa is divided into at least two regions F and G. Then, by using a value f (%) of the decrease ratio corresponding to a center value APO$_F$ of the region F, and a value g (%) of the decrease ratio corresponding to a center value APO$_G$ of the region G, the control system determines a value of the decrease ratio corresponding to the accelerator opening degree APO. The request torque requested by the driver is approximately proportional to the accelerator opening degree APO, as shown in FIG. 12. Accordingly, the target EGR rate is decreased in accordance with the request torque. By varying the decrease quantity of the exhaust gas recirculation rate in accordance with the request torque at the time of acceleration in this way, the control system can avoid operation in the fuel enrichment region caused by deeper depression of the accelerator pedal, and further improve the fuel consumption with the maximum exhaust gas recirculation, as in the first practical example of FIGS. 10 and 11.

Figure 14:
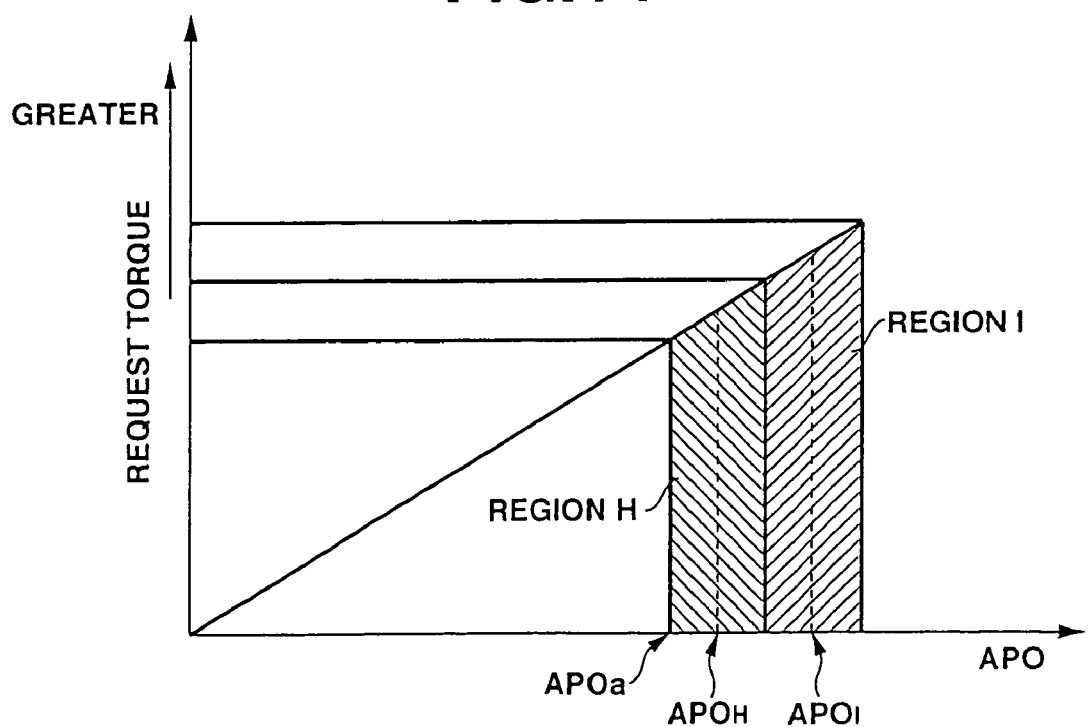
FIG. 14 is a characteristic view between the request torque and accelerator opening degree, for illustrating the decrease correction of exhaust gas recirculation in a third practical example which can be used in the control system of the first embodiment.
Figure 15:
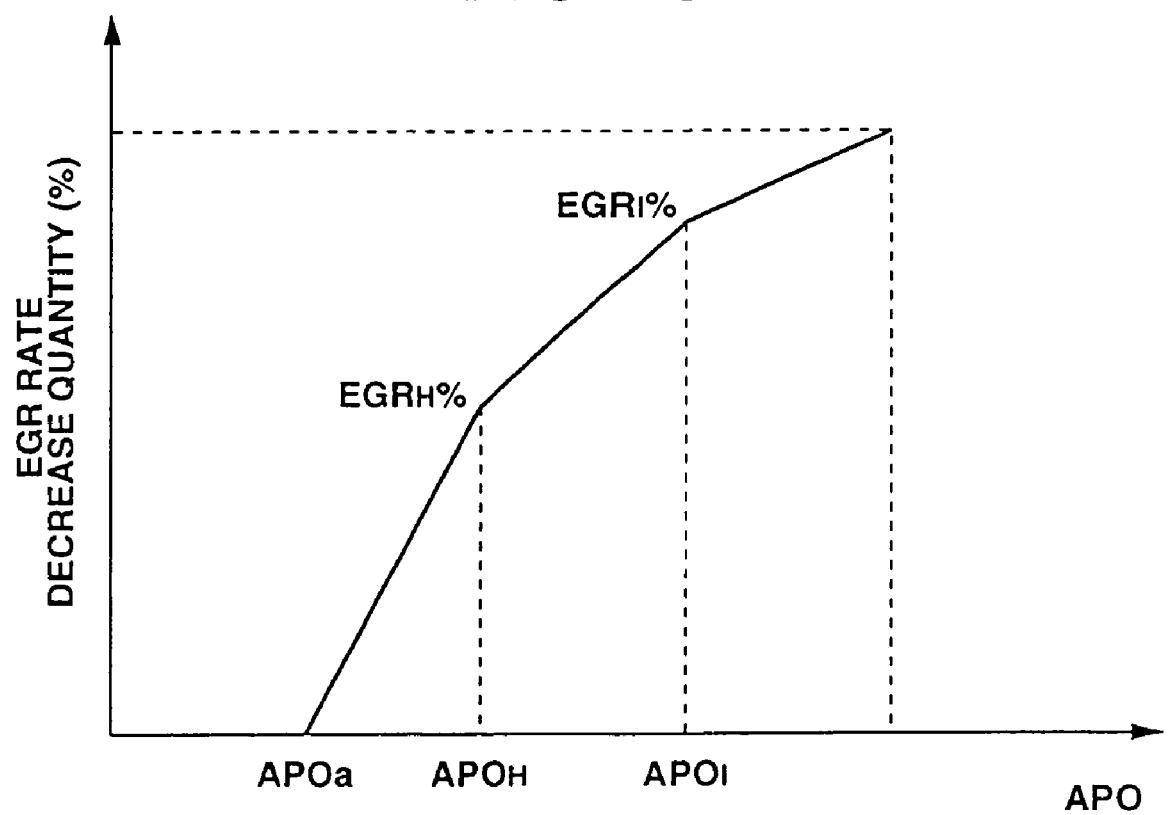
FIG. 15 is a characteristic view between a target EGR rate decrease quantity and accelerator opening degree to illustrate the third practical example of FIG. 14.

FIGS. 14 and 15 show a third practical example in which an EGR rate decrease quantity is determined in accordance with the accelerator opening degree APO, and the final EGR rate is determined by subtracting this EGR rate decrease quantity from the value determined by the normal target EGR map. As shown in FIG. 15, in the region of the accelerator opening degree APO smaller than or equal to APOa used at step S2, the EGR rate decrease quantity is equal to zero. The EGR rate decrease quantity is increased as the accelerator opening degree APO increases from APOa. In this example, as shown in FIG. 14, the region of the accelerator opening degree APO greater than APOa is divided into at least two regions H and I. Then, by using a value EGR$_H$ (h) (%) of the decrease quantity corresponding to a center value APO$_H$ of the region H, and a value EGR$_I$ (i) (%) of the decrease quantity corresponding to a center value APO$_I$ of the region I, the control system determines a value of the decrease quantity corresponding to the accelerator opening degree APO. The request torque requested by the driver is approximately proportional to the accelerator opening degree APO, as shown in FIG. 14. Accordingly, the target EGR rate is decreased in accordance with the request torque as in the second practical example of FIGS. 12 and 13. By varying the decrease quantity of the exhaust gas recirculation rate in accordance with the request torque at the time of acceleration in this way, the control system can avoid operation in the fuel enrichment region caused by deeper depression of the accelerator pedal, and further improve the fuel consumption with the maximum exhaust gas recirculation, as in the first and second practical examples.

In the first embodiment, the fuel enrichment region is regarded as a fuel economy deterioration region. The fuel economy deterioration region is a high engine load region where the fuel economy becomes significantly worse. It is possible to define the fuel economy deterioration region adequately according to the need. The fuel consumption is influenced by the ignition timing, too. Accordingly, it is optional to define the fuel economy deterioration region on the basis of actual characteristics of the fuel consumption in consideration of the ignition timing and other factors. It is preferable to vary the amount of decrease of the EGR rate in accordance with the magnitude of the above-mentioned margin, or the magnitude of request torque. According to the first embodiment, when the torque margin is large, the control system allows the exhaust gas recirculation in a larger quantity, and thereby fully improve the fuel consumption. When the margin is small, the control system limits the exhaust gas recirculation to a smaller quantity, and thereby prevent deterioration of the fuel consumption by accelerator pedal depression by the driver.

FIGS. 16~22 are views for illustrating a second embodiment of the present invention.

The control system of the before-mentioned patent document D2 (JP H03(1991)-172666) delays a shift operation of a continuously variable transmission having a lockup mechanism. In the case of vehicle acceleration in a lockup region, this control system releases the lockup mechanism and delays the shift operation, to improve the acceleration response.) However, during the delay of the shift operation, the transmission ratio is held fixed, and the load of the engine is increased significantly, to the disadvantage of the fuel economy especially when the acceleration is requested at a relatively high load region. To produce the vehicle driving force requested by the driver without varying the transmission ratio, the engine system must increase the engine load as compared to the engine operation with variation of the transmission. Therefore, the engine operating point readily enters the fuel economy deterioration region. Specifically when the exhaust gas recirculation is continued after a driver's request of acceleration, the rise of torque is slow and hence the driver tends to depress the accelerator pedal deeper, into the fuel economy deterioration region. If the decrease of the exhaust gas recirculation and a delay of the transmission shift operation are performed independently of each other, the vehicle driving force is varied unnaturally, and the vehicle maneuverability and ride comfort tend to become poorer. The control system according to the second embodiment is arranged to delay a shift operation of the continuously variable transmission in accordance with the margin from the engine operating point at the time of detection of the driver's acceleration request, to the fuel economy deterioration region, and to decrease the exhaust gas recirculation during the delay time of the shift operation.

Figure 16:
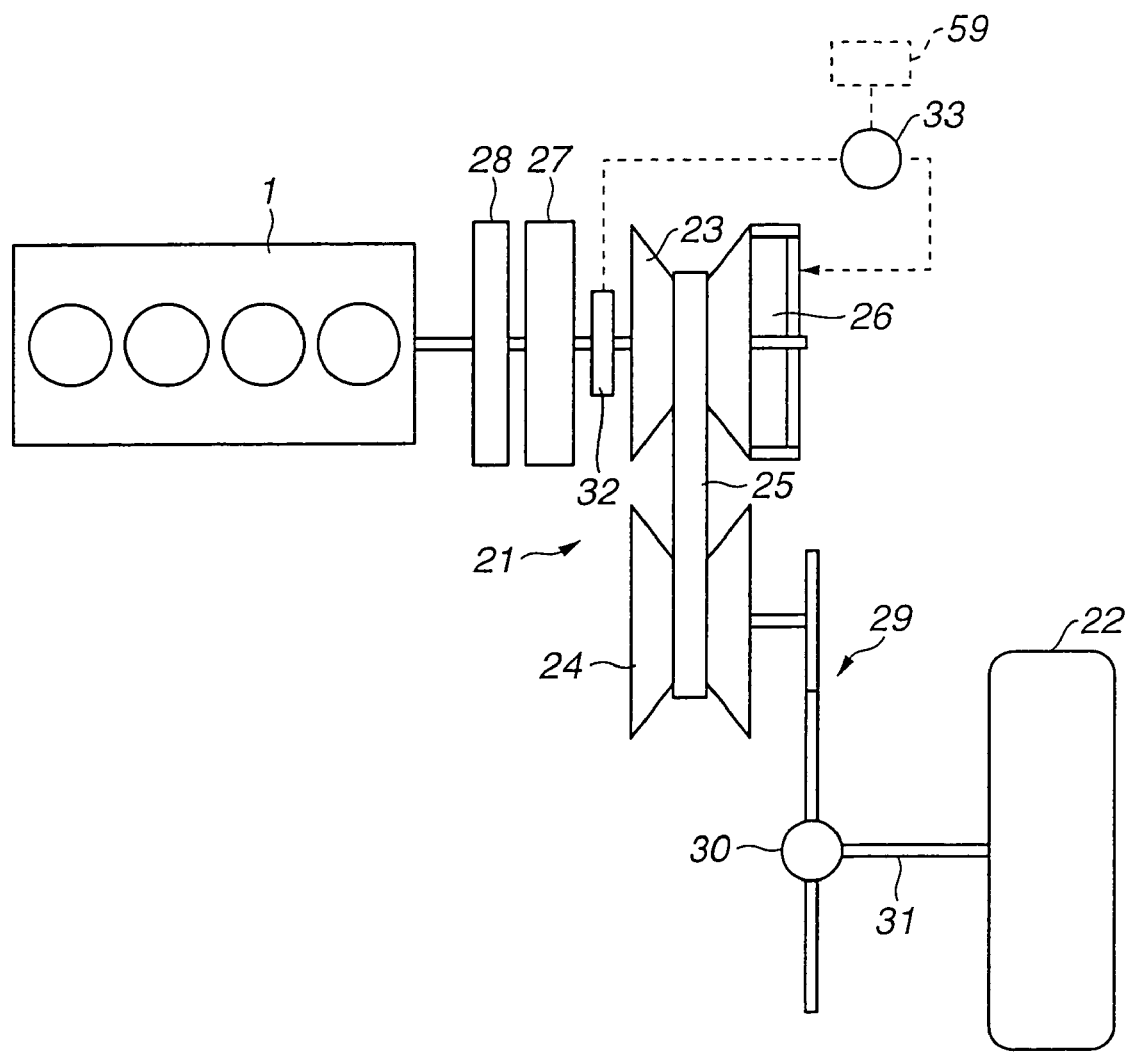
FIG. 16 is a schematic view showing a vehicle drive system employed in a control system according to a second embodiment of the present invention.

FIG. 16 schematically shows a belt type continuously variable transmission 21 through which the driving force of an internal combustion engine 1 is transmitted to drive wheels 22 (only one wheel is shown in FIG. 16 for simplification).

This continuously variable transmission 21 includes a primary pulley 23 on the driving side, a secondary pulley 24 on the driven side, and a metal belt 25 drivingly connecting both pulleys. One of the pulleys 23 and 24 is a first pulley and the other is a second pulley. The pulley width of primary pulley 23 is varied by the hydraulic pressure in a hydraulic pressure chamber 26, and the secondary pulley 24 varies its own pulley width in accordance with the width of primary pulley 23. In this way, continuously variable transmission 21 can vary the transmission speed ratio continuously. The hydraulic pressure chamber 26 can be regarded as a pressure chamber of a hydraulic actuator.

The rotation shaft of primary pulley 23, that is a transmission input shaft, is connected with the crankshaft of engine 1 through a forward reverse changeover mechanism 27 including a planetary gear system, and a torque converter 28. The rotation shaft of secondary pulley 4, that is a transmission output shaft, is connected with an axle shaft of drive wheel 22, through a final gear 29 and a differential gear 30.

For producing a control fluid pressure to control CVT 21, there is provided, on the output side of the forward reverse changeover mechanism 27, an oil pump 32 of a mechanical type which, in this example, a gear pump. The oil pressure produced by oil pump 32 is supplied to a hydraulic control section 33 including a pressure regulator valve and a pressure control valve. This hydraulic control section 33 receives the oil pressure from oil pump 32, and produces the control pressure supplied to hydraulic pressure chamber 26, to control the transmission ratio of CVT 21 under the control of a CVT control unit 59 in accordance with one or more vehicle operating conditions. The CVT transmission ratio is basically varied by the action of the control pressure in hydraulic pressure chamber 26 for actuating the primary pulley 23. In this example, secondary pulley 24 also have a similar pressure chamber arranged to produce an adequate belt tension by receiving a fluid pressure for secondary pulley 24. During a transient period during which the pulley width is adjusted for a shift operation, the continuously variable transmission 21 requires a relatively high fluid pressure to prevent slippage of belt 25, as compared to the period of the steady state. Therefore, the driving torque of oil pump 32 is increased, and the friction in various parts is increased during the transient period, so that the loss in the engine torque becomes greater.

In the second embodiment, too, engine 1 is arranged in an engine system as shown in FIG. 1; and controlled as shown in FIG. 2 in the same manner as in the first embodiment. The control system according to the second embodiment controls the transmission speed ratio of continuously variable transmission 21 as shown by the line "EMBODIMENT" in FIG. 3 of in the first embodiment.

The transmission ratio of CVT 21 is controlled continuously by CVT control unit 59 shown in FIG. 16, basically in accordance with accelerator opening degree APO and vehicle speed. CVT control unit 59 is connected with engine control unit 19 by a network enabling exchange of various signals and information between the engine control unit 19 and CVT control unit 59. In the illustrated embodiment, a controller for controlling the engine and transmission is composed of two different control units 19 and 59. However, it is possible to employ a single control unit for controlling both engine 1 and transmission 21, in place of engine control unit 19 and CVT control unit 59.

In the case of vehicle acceleration requested by depression of the accelerator pedal by the driver, the control system according to the second embodiment checks the margin of torque to the fuel enrichment region, and determines whether the transmission shift operation is delayed or not.

Figure 17:
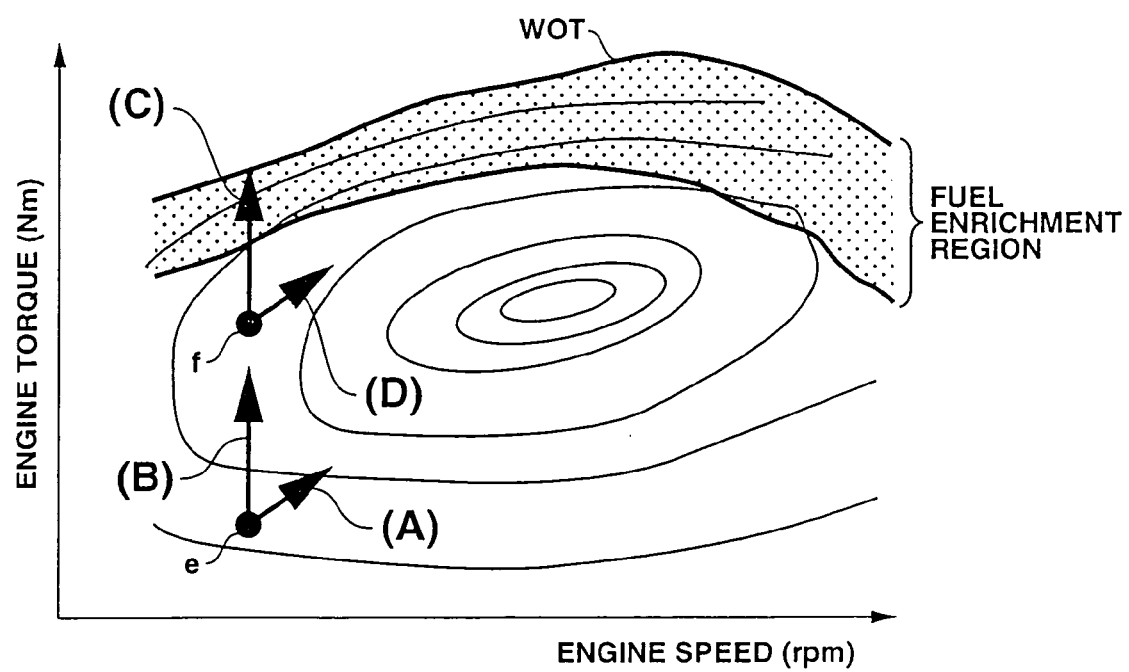
FIG. 17 is a characteristic view illustrating shift of an engine operating point in the control system according to the second embodiment in the case of rapid acceleration.

When, for example, the accelerator pedal is depressed by the driver for rapid vehicle acceleration while the engine is operated at an operating point e shown in FIG. 17, the engine operating point determined by the engine torque and engine speed moves as shown by an arrow (A) in FIG. 17 if a shift operation of CVT 21 is performed simultaneously and the engine speed is increased due to variation of the speed ratio. However, in this case, if the CVT shift operation is performed at the early stage of the vehicle acceleration, part of the engine torque is consumed for increasing the CVT control fluid pressure for the shift operation, and the engine torque actually used for the vehicle acceleration is decreased so that the acceleration response becomes worse. In view of this, the control system according to the second embodiment delays the transmission shift operation for a predetermined delay time in the case of acceleration at the engine operating point where the margin to the fuel enrichment region is sufficiently wide. Thus, in the early stage of the acceleration, the control system accelerates the vehicle with the increase in torque of engine 1 without varying the speed ratio of CVT 21. By delaying the shift operation in this way, the control system can restrain the consumption of engine torque to increase the fluid pressure for the transmission shift operation, and thereby improve the vehicle response to the driver's accelerator input. In this case, the engine torque is increased greatly without no substantial variation of the engine speed, and hence the engine operating point moves as shown by an arrow (B) in FIG. 17.

When, on the other hand, a rapid acceleration is requested at an engine operating point, such as a point f in FIG. 17, where the margin between the engine operating point and the lower boundary of the fuel enrichment region is narrow, a delay of the CVT shift operation causes the engine operating point to move upward as shown by an arrow (C) in FIG. 17 into the fuel enrichment region detrimental to the fuel economy since the engine torque increases without substantial increase in the engine speed. Therefore, the control system according to the second embodiment starts the shift operation of CVT 21 immediately without delay when an acceleration request is produced at an engine operating point near the lower boundary of the fuel enrichment region where the margin is narrow. As a result, the engine torque increases nonexcessively together with an increase in the engine speed, and the engine operating point moves as shown by an arrow (D) in FIG. 17 without entering the fuel enrichment region. Moreover, in this case, the control system does not perform the correction of the exhaust gas recirculation rate, and perform the exhaust gas recirculation by using the target EGR map of FIG. 2 without modification. Therefore, the control system can improve the fuel economy fully by reduction of pumping loss.

When the margin is wide and the operating point is shifted as shown by the arrow (B) in FIG. 17 by a delay in the CVT shift operation, the exhaust gas recirculation in a large amount decreases the amount of fresh air flowing into the combustion chamber and hence the engine torque is not increased quickly by opening of the throttle valve. Therefore, the driver tends to depress the accelerator pedal further unconsciously wanting rapid acceleration, and the engine operating point tends to move to the high load side into the fuel enrichment region. The control system according to the second embodiment, therefore, decreases the exhaust gas recirculation quantity to zero or a smaller level, simultaneously with the delay of the CVT shift operation. By limiting the exhaust gas recirculation in this way, the control system increases the quantity of fresh air flowing into the engine, and increases the engine torque quickly in response to an increase in the throttle opening degree, so that the driver feels no need to depress the accelerator pedal further.

When the driver's request is not an acceleration request for rapid request, but gradual acceleration is request, the control system of the second embodiment controls CVT 21 in a normal shift control mode without performing a delay operation to delay the transmission shift operation. Moreover, the control system controls the exhaust gas recirculation in the normal EGR control mode without correction.

Figure 18:
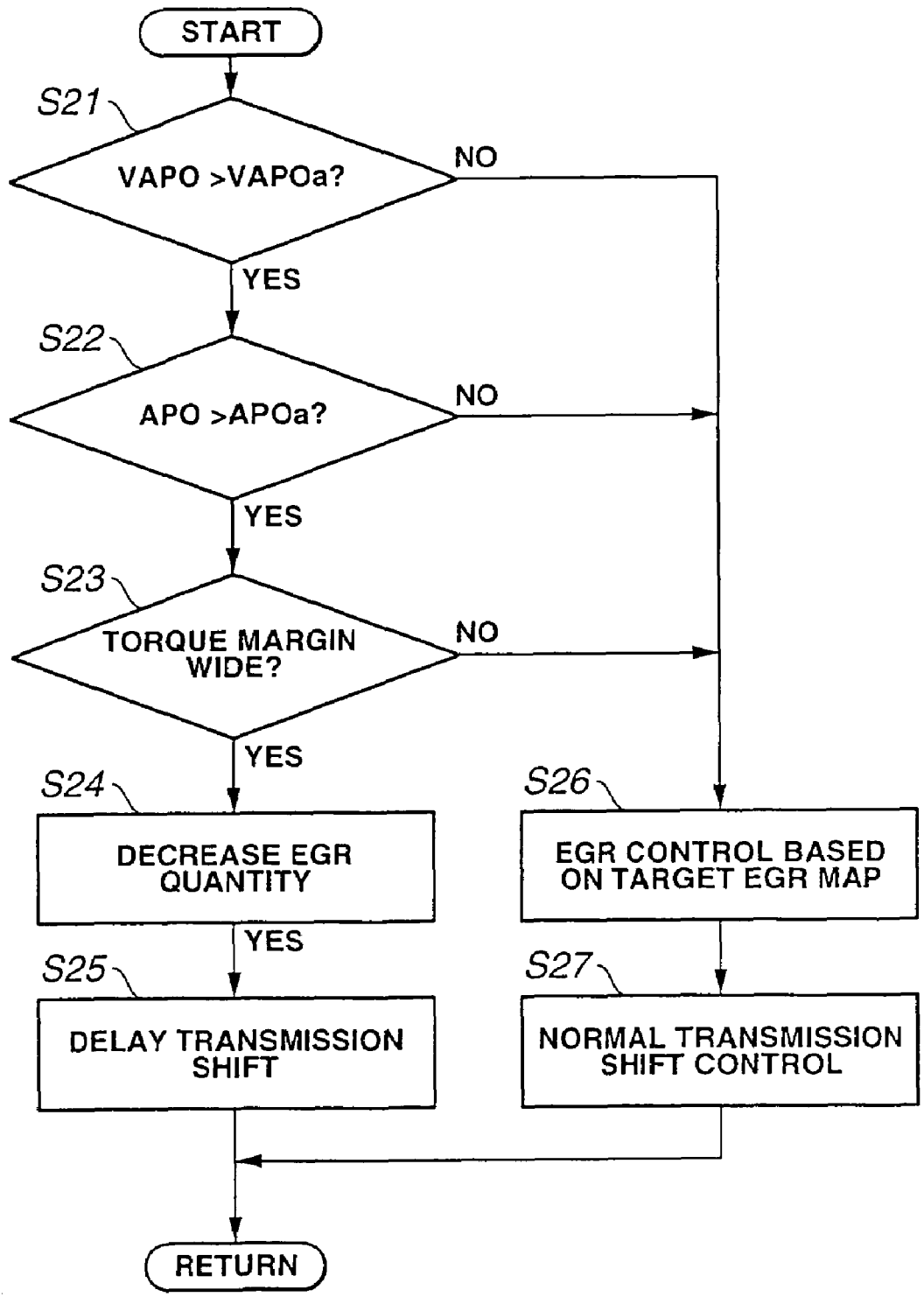
FIG. 18 is a flowchart showing a control process performed by the control system of the second embodiment.

FIG. 18 is a flowchart showing a main portion of a control process for an exhaust gas recirculation control and a shift delay control performed by the control system according to the second embodiment.

Steps S21 and S22 are for examining whether rapid acceleration is requested by the driver. Step S21 determines whether or not a variation speed (or a time rate of change or accelerator opening speed) VAPO of the accelerator opening degree APO is greater than a predetermined speed value VAPOa. Step S22 determines whether the accelerator opening degree APO is greater than a predetermined degree value APOa. Thus, the control system determines that a driver's rapid acceleration request is produced when the driver depresses the accelerator pedal rapidly and deeply. If the answer of S21 or S22 is NO, then the program proceeds to step S26 for normal EGR control based on the target EGR map of FIG. 2. Therefore, at S26, the exhaust gas recirculation is performed in the normal EGR control mode based on the target EGR map of FIG. 2. At a next step S27 following S26, the control system controls the transmission ratio of CVT 21 in a normal shift control mode in accordance with the vehicle operating conditions without delay.

When a rapid acceleration request is present and the answers of S21 and S22 are both YES, then the program proceeds to step S23 to determine a margin of torque to the fuel enrichment region in accordance with the engine operating condition at that time, and to determine whether the margin is wide or not. The control system according to the second embodiment determines whether the margin is wide or not by using one of the before-mentioned first, second and third practical examples shown in FIGS. 7, 8 and 9. When the margin is narrow, then the program of FIG. 18 proceeds from S23 to S26, and the control system performs the exhaust gas recirculation in the normal control mode based on the target EGR map, and the normal CVT shift control. Therefore, the EGR control is continued in the normal mode in accordance with the operating conditions, and the transmission ratio of CVT 21 is controlled immediately without delay to a desired ratio determined mainly by the vehicle speed and accelerator opening degree APO.

When, on the other hand, the conclusion of S23 is that the margin is wide or sufficient, then the program proceeds from S23 to step S24 to perform an EGR control operation to control the EGR rate by using a corrected (or decreased) target EGR rate which decreased as compared to the normal EGR control mode of S26, for a delay time of the CVT shift operation. Thus, the control system of the second embodiment decreases the EGR rate as compared to the EGR rate in the steady state. In the second embodiment, the control system decreases the target EGR rate by one of later-mentioned practical examples similar to the examples shown in FIGS. 10 and 11, FIGS. 12 and 13, and FIGS. 14 and 15. After S24, the control system proceeds to step S25, and delays the transmission shift operation by holding the transmission speed ratio of CVT 21 unchanged for a predetermined delay time ($\Delta T$).

Figure 19:
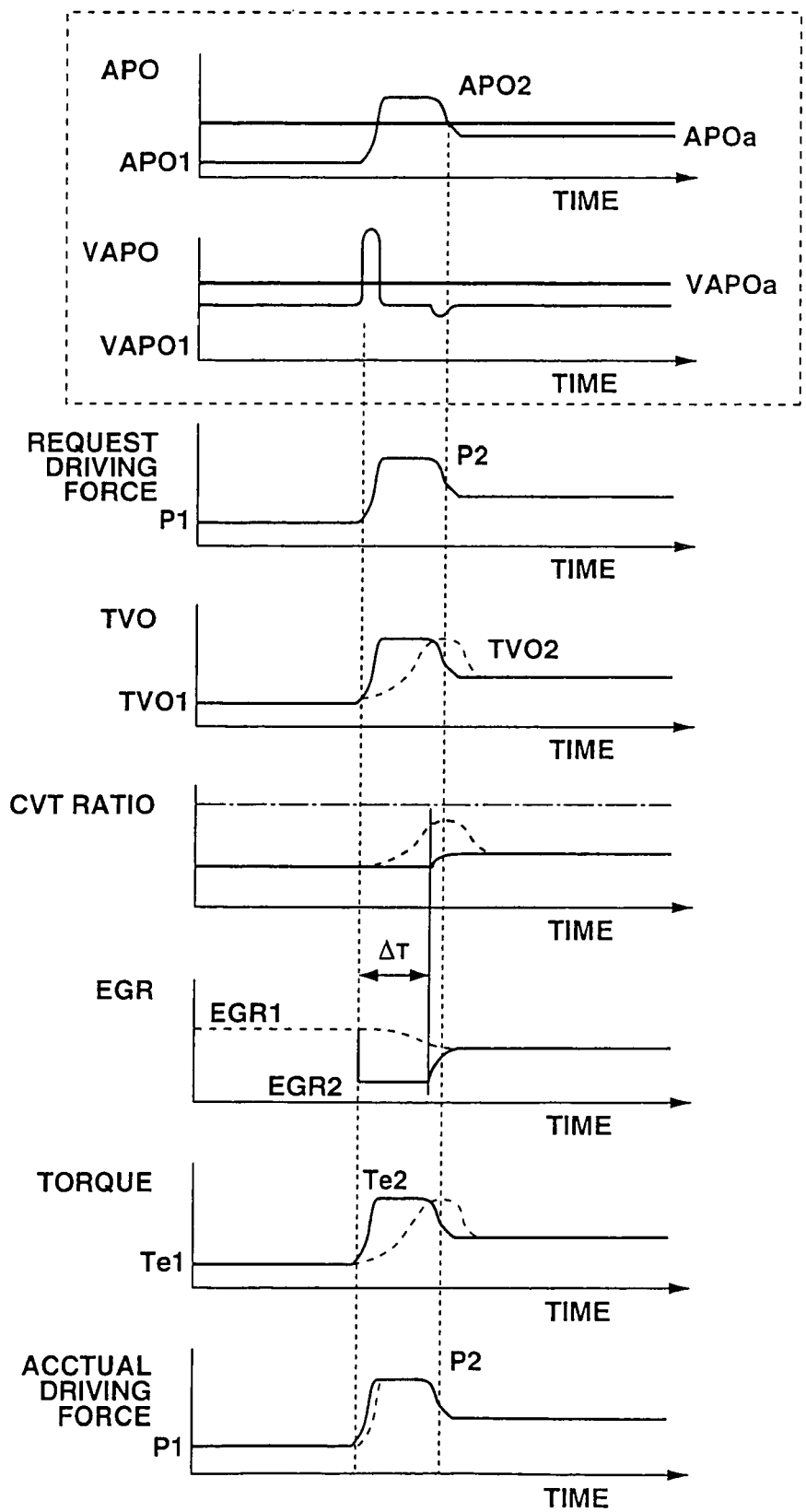
FIG. 19 is a time chart showing variation of various parameters during a rapid acceleration to illustrate operations of the control system according to the second embodiment.

FIG. 19 is a time chart similar to FIG. 6 of the first embodiment, but showing operations of the control system according to the second embodiment in the case of rapid acceleration at the engine operating point having a wide margin to the fuel enrichment region. FIG. 19 shows variation with time of the accelerator opening degree APO, accelerator opening speed VAPO, request driving torque P, throttle valve opening degree TVO, a CVT transmission ratio, exhaust gas recirculation rate EGR, engine torque Te, and actual driving force. In this example, the accelerator opening degree APO exceeds the predetermined value APOa, and at the same time, the accelerator opening speed VAPO exceeds the predetermined value VAPOa. Therefore, the control system concludes that there is a rapid acceleration request. The request driving force P is a driving force (a product of torque and rotational speed) required in conformity with the driver's acceleration request. In this example, the request driving torque P is regarded as being substantially equal to the accelerator opening degree APO. The throttle valve opening degree TVO is controlled in accordance with request driving torque P, and the engine torque Te is varied basically in conformity with throttle opening degree TVO.

In FIG. 19, broken lines show characteristics resulting when the CVT shift operation is performed immediately at the time of rapid acceleration. In this case, throttle opening degree TVO is controlled on the basis of variation of the CVT transmission ratio shown by the broken line, so that the engine torque rises only gradually as shown by the broken line. The rise of the finally obtained actual driving force is delayed after the rise of the request driving force, as shown by the broken line, by the increase in torque loss by the shift operation of CVT 21. Furthermore, the continuation of the exhaust gas recirculation during the acceleration as shown by the broken line with a large quantity further delays the rise of engine torque Te, and increases the tendency of further depression of the accelerator pedal.

By contrast, the control system according to the second embodiment holds the CVT transmission ratio unchanged as shown by a solid line in FIG. 19 for a predetermined delay time (interval) $\Delta T$ from the time of occurrence of the acceleration request, and starts the shift operation at the expiration of the delay time $\Delta T$. By so doing, the control system can avoid an increase in the torque loss due to the shift operation of CVT 21. Throttle opening degree TVO is increased largely as shown by a solid line to produce the request driving force without varying the transmission ratio, and the engine torque Te increases quickly. The exhaust gas recirculation rate is controlled at a lower level during the delay time $\Delta T$ of the shift operation, and the quantity of the exhaust gas recirculation is limited to the low level. Therefore, the engine torque Te rises earlier in response to an increase in TVO, and the response to the accelerator input is improved significantly.

After the expiration of the delay time $\Delta T$, CVT 21 starts the shift operation, and the EGR rate is increased to the level of the normal control mode simultaneously. In this way, the control system varies the transmission ratio and the EGR rate simultaneously, and thereby prevents an undesired torque step causing unpleasant sensation.

Figure 20:
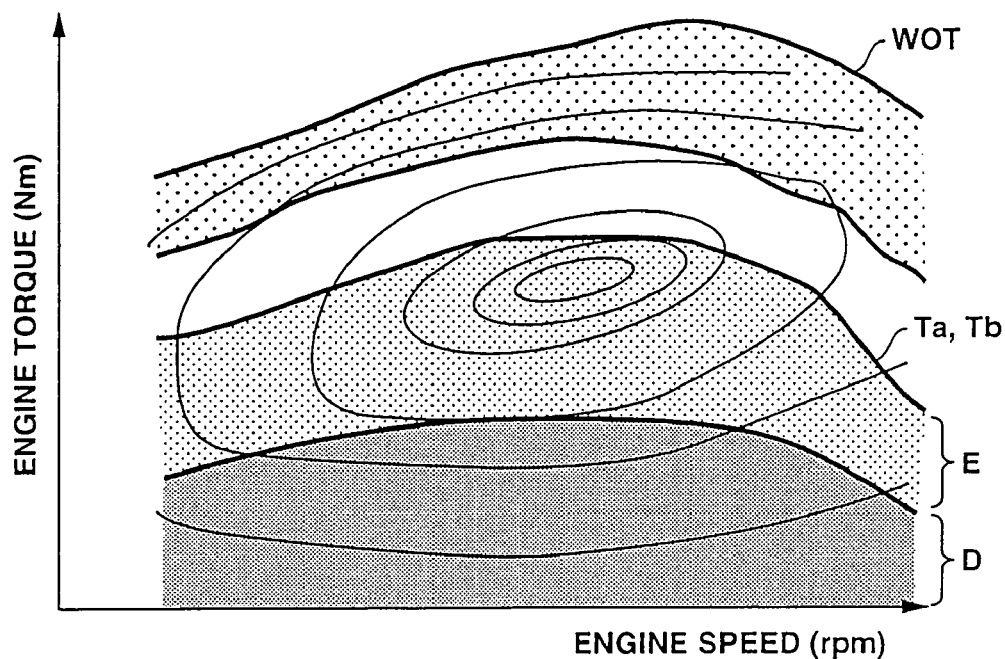
FIG. 20 is a characteristic view for illustrating the determination of a delay time ΔT in a first practical example which can be used in the control system of the second embodiment.

The delay time $\Delta T$ may be a constant, or may be varied in accordance with one or more operating conditions. For example, the region where the margin is regarded as wide is divided into a plurality of regions. In an example shown in FIG. 20, the region under the threshold line of the threshold Ta of FIG. 7 or Tb of FIG. 8, for example is divided into a lower region D (where the margin is greater) and an upper region E (where the margin is smaller). The delay time ΔT is set to a first (greater) value ΔTd when the engine operating point at the time of an acceleration request is in the lower region D where the margin is greater; and set to a second (smaller) value ΔTe smaller than ΔTd (ΔTd>ΔTe) when the engine operating point at the time of an acceleration request is in the upper region E closer to the fuel enrichment region. In the example of FIG. 20, the delay time ΔT is made shorter as the margin becomes smaller. Thus, the shift operation starts earlier in the upper region E, and the control system can reliably prevent an entry into the fuel enrichment region by an increase in the engine torque.

Figure 21:
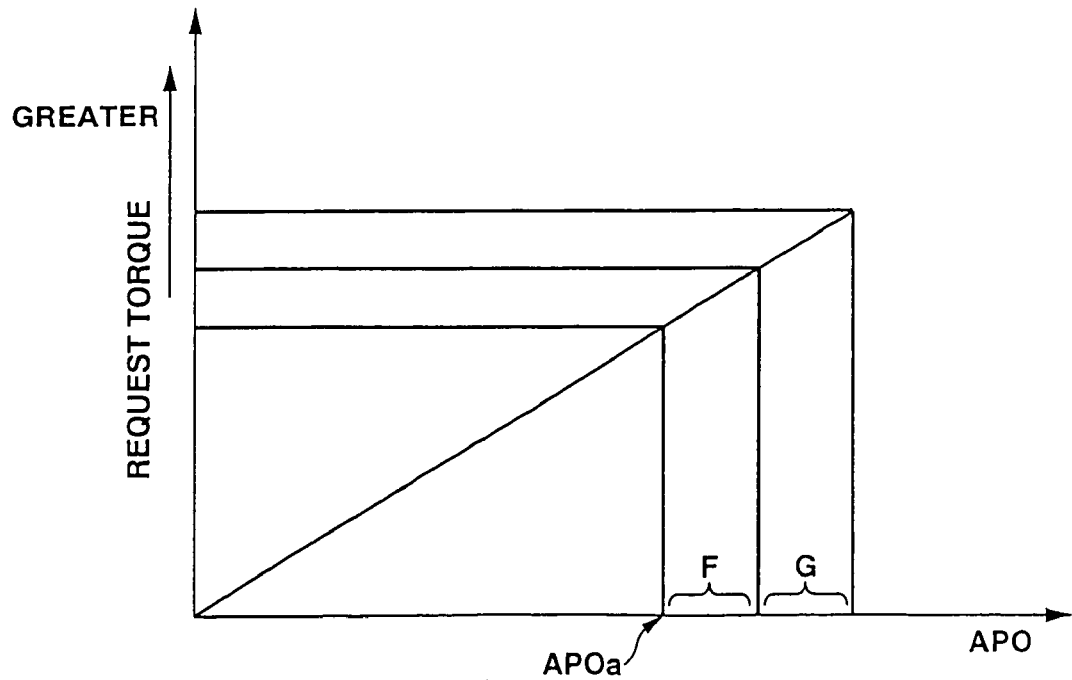
FIG. 21 is a characteristic view for illustrating the determination of the delay time ΔT in a second practical example which can be used in the control system of the second embodiment.

FIG. 21 show another example in which the delay time ΔT is adjusted in accordance with the request torque requested by the driver. In this example, the delay time ΔT is determined in accordance with accelerator opening degree APO related to the request torque as shown in FIG. 21. The APO region greater than the predetermined value APOa of S22 is divided into a first (smaller APO) region F and a second (larger APO) region G. The delay time ΔT is set to a first (smaller) value ΔTf when the accelerator opening degree APO at the time of an acceleration request is in the first (smaller APO) region F; and set to a second (greater) value ΔTg greater than ΔTf (ΔTf<ΔTg) when the accelerator opening degree APO at the time of an acceleration request is in the second (greater APO) region G. In the example of FIG. 21, the delay time ΔT is made greater when the driver request a more rapid acceleration, and the request torque is greater. Thus, the response to the accelerator input is improved more when the requested acceleration is rapid.

The check of the margin of torque at S23 according to the second embodiment can be performed in one of the three practical examples shown in FIGS. 7, 8 and 9 for the first embodiment.

In determining whether the torque is greater than to the threshold to check the margin of torque to the stoichiometric air fuel limit bounding the fuel enrichment region, it is possible to use, in place of the engine torque at the time of detection of a driver's acceleration request, one of the intake air quantity of the engine, the fuel injection pulse width, the throttle valve opening degree TVO and the intake negative pressure, as a parameter (torque parameter or load parameter) representing the engine torque.

The control system according to the second embodiment can decrease the exhaust gas recirculation rate can be decreased at step S24 in one of the following examples similar to the methods shown in FIGS. 10 and 11, FIGS. 12 and 13 and FIGS. 14 and 15.

Figure 22:
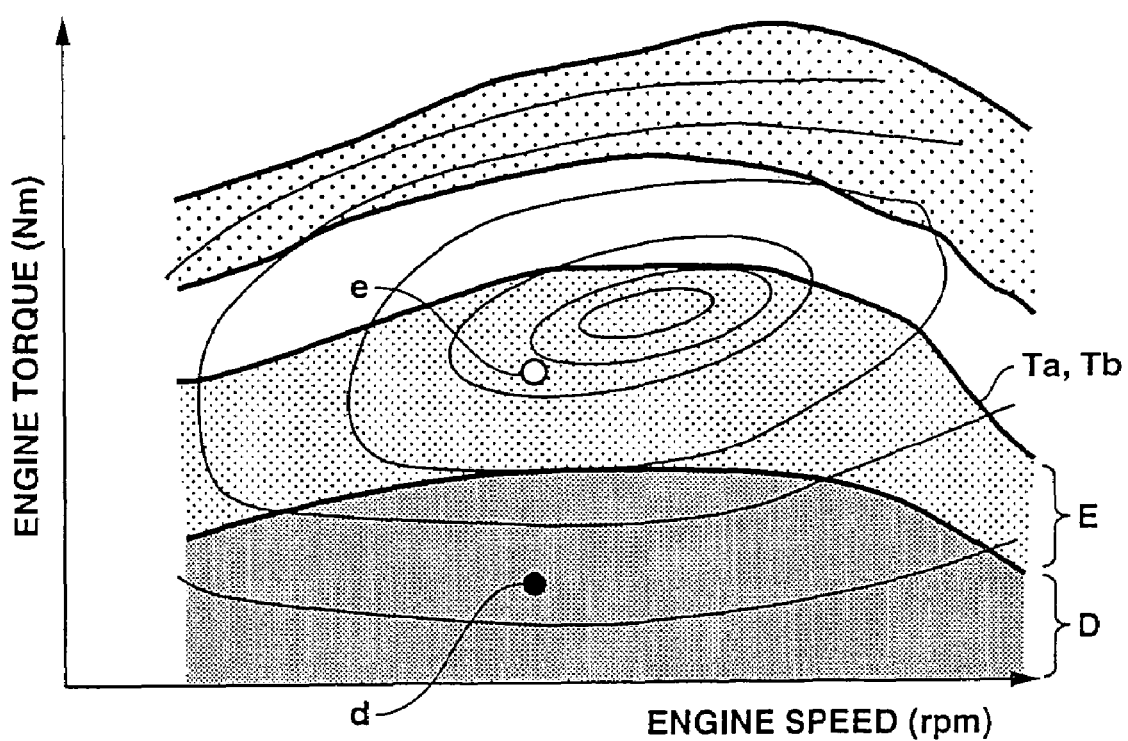
FIG. 22 is a characteristic view for illustrating the decrease correction of exhaust gas recirculation in a first practical example which can be used in the control system of the second embodiment, in place of FIG. 10.

FIG. 22 shows a first practical example which can be used in the second embodiment. In this example, the region under the threshold line of the threshold (such as Ta of FIG. 7 or Tb of FIG. 8, for example) where the margin is judges to be wide, is divided into a plurality of regions. In the example of FIG. 22, this region under the threshold line is divided into a lower (lower load) region D and an upper (higher load) region E. A decreased target EGR rate EGRd is set for a torque value of a middle point d in the lower region D, and a decreased target EGR rate EGRe is set for a torque value of a middle point e in the upper region E. Each of the decreased target EGR rates EGRd and EGRe is a target EGR rate decreased as compared to the target EGR rate of the normal target EGR map. Then, the target EGR rate is determined by interpolation by using the decreased target EGR rates EGRd and EGRe, in accordance with the engine torque at the time of rapid acceleration request, in a similar manner as shown in FIG. 11. The target EGR torque EGRe of the upper region E where the margin is narrower is smaller than the target EGR rate EGRd of the lower region D where the margin is wider. Therefore, the target EGR rate is decreased as the margin becomes narrower. By varying the decrease quantity of the exhaust gas recirculation in accordance with the magnitude of the margin of torque in this way, the control system according to the second embodiment can avoid operation in the fuel enrichment region caused by deeper depression of the accelerator pedal, and further improve the fuel consumption with the maximum exhaust gas recirculation.

In a second practical example, the decrease ratio or percentage (%) of the target EGR rate is determined in accordance with the accelerator opening degree APO in the same manner as shown in FIGS. 12 and 13. The decrease ratio is a ratio of a decrease to the value of the normal target EGR map. The normal target EGR rate is used without modification if the decrease ratio is equal to 0 (%). If the decrease ratio is equal to 100%, the final target EGR rate becomes equal to 0. As shown in FIG. 13, in the region in which the accelerator opening degree APO is equal to or smaller than the predetermined value APOa used at S22, the decrease ratio is zero. The decrease ratio is increased as the accelerator opening degree APO increases from APOa. The decrease ratio becomes equal to 100% when the accelerator opening degree APO becomes equal to a value at or near the fully open state of the accelerator. In this example, as shown in FIG. 12, the region of the accelerator opening degree APO greater than APOa is divided into at least two regions F and G. Then, by using a value f (%) of the decrease ratio corresponding to a center value $APO_F$ of the region F, and a value g (%) of the decrease ratio corresponding to a center value $APO_G$ of the region G, the control system according to the second embodiment determines a value of the decrease ratio corresponding to the accelerator opening degree APO. The request torque requested by the driver is approximately proportional to the accelerator opening degree APO, as shown in FIG. 12. Accordingly, the target EGR rate is decreased in accordance with the request torque. By varying the decrease quantity of the exhaust gas recirculation rate in accordance with the request torque at the time of acceleration in this way, the control system according to the second embodiment can avoid operation in the fuel enrichment region caused by deeper depression of the accelerator pedal, and further improve the fuel consumption with the maximum exhaust gas recirculation, as in the first practical example of FIGS. 22 and 11.

In a third practical example, an EGR rate decrease quantity is determined in accordance with the accelerator opening degree APO, and the final EGR rate is determined by subtracting this EGR rate decrease quantity from the value determined by the normal target EGR map in the same manner as shown in FIGS. 14 and 15. As shown in FIG. 15, in the region of the accelerator opening degree APO smaller than or equal to APOa used at step S22, the EGR rate decrease quantity is equal to zero. The EGR rate decrease quantity is increased as the accelerator opening degree APO increases from APOa. In this example, as shown in FIG. 14, the region of the accelerator opening degree APO greater than APOa is divided into at least two regions H and I. Then, by using a value $EGR_H$ (h) (%) of the decrease quantity corresponding to a center value $APO_H$ of the region H, and a value $EGR_I$ (i) (%) of the decrease quantity corresponding to a center value $APO_I$ of the region I, the control system according to the second embodiment determines a value of the decrease quantity corresponding to the accelerator opening degree APO. The request torque requested by the driver is approximately proportional to the accelerator opening degree APO, as shown in FIG. 14. Accordingly, the target EGR rate is decreased in accordance with the request torque as in the second practical example of FIGS. 12 and 13. By varying the decrease quantity of the exhaust gas recirculation rate in accordance with the request torque at the time of acceleration in this way, the control system according to the second embodiment can avoid operation in the fuel enrichment region caused by deeper depression of the accelerator pedal, and further improve the fuel consumption with the maximum exhaust gas recirculation, as in the preceding practical examples.

This application is based on a prior Japanese Patent Application No. 2004-22351 filed on Jan. 30, 2004, and a prior Japanese Patent Application No. 2004-22350 filed on Jan. 30, 2004. The entire contents of these Japanese Patent Applications Nos. 2004-22351 and 2004-22350 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus, comprising:
an internal combustion engine;
an exhaust recirculation system arranged to recirculate part of exhaust from the engine, into intake stream to the engine;
an acceleration request sensing section arranged to sense a driver's acceleration request;
an engine operating condition sensing section arranged to sense a current engine operation condition at the time of detection of the driver's acceleration request; and
a controlling section configured to estimate a margin from the engine operating condition at the time of detection of the driver's acceleration request, to a fuel economy deterioration region in a high engine load region, and to control an EGR quantity of the exhaust recirculation system in accordance with the margin.

2. The control apparatus as claimed in claim 1, wherein the controlling section is configured to normally control the EGR quantity at a normal level, and to decrease the EGR quantity as compared to the normal level when the margin to the fuel economy deterioration region is smaller than a predetermined threshold.

3. The control apparatus as claimed in claim 2, wherein the controlling section is configured to decrease the EGR quantity as the margin decreases.

4. The control apparatus as claimed in claim 2, wherein the controlling section is configured to decrease the EGR quantity as a request torque requested by a driver of a vehicle at the time of detection of the driver's acceleration request is greater.

5. The control apparatus as claimed in claim 2, wherein the control apparatus further comprises a continuously variable transmission connected with the engine.

6. The control apparatus as claimed in claim 1, wherein the control apparatus further comprises a continuously variable transmission connected with the engine; and the controlling section is configured to delay a shift operation of the continuously variable transmission in accordance with the margin from the engine operating condition at the time of detection of the driver's acceleration request, to the fuel economy deterioration region.

7. The control apparatus as claimed in claim 6, wherein the controlling section is configured to delay the shift operation of the continuously variable transmission when the margin increases, and to decrease the EGR quantity during a delay time during which the shift operation is delayed.

8. The control apparatus as claimed in claim 7, wherein the control apparatus further comprises an oil pump which is driven by the engine, and which is arranged to supply a control fluid pressure to the continuously variable transmission.

9. The control apparatus as claimed in claim 8, wherein the continuously variable transmission comprises a first pulley, a second pulley, a belt connecting the first and second pulleys, and a hydraulic actuator arranged to receive the fluid pressure from the oil pump, and to vary a pulley width of at least one of the first and second pulleys to continuously vary a transmission ratio of the continuously variable transmission; and the control fluid pressure is increased during the shift operation of the continuously variable transmission to prevent slippage of the belt.

10. The control apparatus as claimed in claim 7, wherein the controlling section is configured to normally perform a normal control operation to perform the shift operation without delay and to control the EGR quantity at a normal level; to delay the shift operation of the continuously variable transmission when the margin is greater than a predetermined threshold; and to hold the EGR quantity at a lower level lower than the normal level during the delay time during which the shift operation is delayed.

11. The control apparatus as claimed in claim 10, wherein the controlling section decreases the EGR quantity to zero during the delay time during which the shift operation is delayed.

12. The control apparatus as claimed in claim 6, wherein the controlling section is configured to determine a delay time during which the shift operation of the continuously variable transmission is delayed, in accordance with the margin.

13. The control apparatus as claimed in claim 6, wherein the controlling section is configured to determine a delay time during which the shift operation of the continuously variable transmission is delayed, in accordance with a request torque determined by the driver's accelerator request.

14. The control apparatus as claimed in claim 1, wherein the fuel economy deterioration region is a fuel enrichment region in which a target air fuel ratio for controlling the engine is set smaller than a stoichiometric air fuel ratio.

15. The control apparatus as claimed in claim 1, wherein the EGR quantity is an EGR rate, and the controlling section determines the margin by using a load parameter representing an engine load of the engine, and a speed parameter representing an engine speed of the engine.

16. The control apparatus as claimed in claim 1, wherein the controlling section determines the margin by using an engine operating condition representing an engine torque of the engine at the time of occurrence of the driver's acceleration request.

17. The control apparatus as claimed in claim 1, wherein the controlling section compares an engine torque of the engine at the time of occurrence of the driver's acceleration request with a predetermined threshold, and controls the EGR quantity of the exhaust recirculation system in accordance with a result of comparison between the engine torque with the threshold.

18. The control apparatus as claimed in claim 17, wherein the controlling section determines the threshold in accordance with an engine speed.

19. The control apparatus as claimed in claim 18, wherein the threshold is set equal to a predetermined percentage of an engine torque value of a boundary of the fuel economy deterioration region corresponding to a speed value of the engine speed at the time of occurrence of the driver's acceleration request.

20. The control apparatus as claimed in claim 18, wherein the threshold is set equal to a difference obtained by subtracting a predetermined value from an engine torque value of a boundary of the fuel economy deterioration region corresponding to a speed value of the engine speed at the time of occurrence of the driver's acceleration request.

21. The control apparatus as claimed in claim 17, wherein the threshold is a constant set equal to a minimum value of an engine torque of a boundary of the fuel economy deterioration region.

22. The control apparatus as claimed in claim 1, wherein the controlling section is configured to produce a first condition signal in response to the driver's acceleration request requesting a rapid acceleration of the vehicle; to produce a second condition signal in accordance with the margin to the fuel economy deterioration region; to control the EGR quantity in a normal control mode when at least one of the first and second condition signals is absent; and to control the EGR quantity in a modified control mode to decrease the EGR quantity when the first and second condition signals are both present.

23. A control process for an internal combustion engine equipped with an exhaust recirculation system, the control process comprising:

monitoring a driver's accelerator input to detect a driver's acceleration request;

sensing an engine operating condition to determine a margin from an engine operating point at the time of detection of the driver's acceleration request, to a fuel economy deterioration region; and controlling an EGR quantity of the exhaust recirculation system in an decreased mode in accordance with the margin.

24. A control apparatus for an internal combustion engine equipped with an exhaust recirculation system, the control apparatus comprising:

means for detecting a driver's accelerator request by monitoring a driver's accelerator input;

means for checking a margin from an engine operating point at the time of detection of the driver's acceleration request, to a fuel economy deterioration region; and means for controlling an EGR quantity of the exhaust recirculation system in an decreased mode in accordance with a result of check of the margin.

* * * * *